United States Patent
Wu et al.

(10) Patent No.: US 12,052,759 B2
(45) Date of Patent: Jul. 30, 2024

(54) METHOD AND DEVICE IN NODE USED FOR WIRELESS COMMUNICATION

(71) Applicants: Keying Wu, Shanghai (CN); Xiaobo Zhang, Shanghai (CN)

(72) Inventors: Keying Wu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 338 days.

(21) Appl. No.: 17/467,298

(22) Filed: Sep. 6, 2021

(65) Prior Publication Data

US 2021/0400729 A1 Dec. 23, 2021

Related U.S. Application Data

(63) Continuation of application No. PCT/CN2020/076941, filed on Feb. 27, 2020.

(30) Foreign Application Priority Data

Mar. 7, 2019 (CN) .......................... 201910172564.6

(51) Int. Cl.
*H04W 74/08* (2024.01)
*H04L 5/00* (2006.01)
(Continued)

(52) U.S. Cl.
CPC ....... *H04W 74/0816* (2013.01); *H04L 5/0005* (2013.01); *H04W 72/044* (2013.01); *H04W 72/1268* (2013.01); *H04W 72/21* (2023.01)

(58) Field of Classification Search
CPC ............. H04W 74/0816; H04W 72/21; H04W 72/044; H04W 72/1268; H04L 5/0005
See application file for complete search history.

(56) References Cited

U.S. PATENT DOCUMENTS 8,971,261 B2* 3/2015 Nam ..................... H04L 1/0073
  370/329
9,048,986 B2* 6/2015 Liu ........................ H04L 5/0044
(Continued)

FOREIGN PATENT DOCUMENTS

CN   102150468 A   8/2011
CN   102946632 A   2/2013
(Continued)

OTHER PUBLICATIONS

ISR in application PCT/CN2020/076941 dated May 8, 2020.
(Continued)

*Primary Examiner* — Bailor C Hsu

(57) ABSTRACT

The present disclosure provides a method and device in node for wireless communications. A first node receives a first signaling and a second signaling; transmits K first radio signals in K time-frequency resource blocks respectively; the K time-frequency resource blocks are orthogonal in time domain; the first signaling indicates the K time-frequency resource blocks; only K1 first radio signals in the K first radio signals respectively comprise K1 second sub-signals, the K1 second sub-signals carry a second bit block, and the second signaling is used to determine the second bit block; a total number of REs occupied by the K1 second sub-signals is not greater than a first value, and a first coefficient is used to determine the first value. When control information is carried on a repeatedly transmitted physical layer data channel, the above method ensures the reliability of data and the control information.

20 Claims, 8 Drawing Sheets

(51) Int. Cl.
*H04W 72/04* (2023.01)
*H04W 72/044* (2023.01)
*H04W 72/12* (2023.01)
*H04W 72/1268* (2023.01)
*H04W 72/21* (2023.01)
*H04W 74/0816* (2024.01)

(56) References Cited

U.S. PATENT DOCUMENTS

| | | | | |
|---|---|---|---|---|
| 10,321,386 | B2* | 6/2019 | Wang | H04L 5/0053 |
| 11,540,258 | B2* | 12/2022 | Lei | H04W 72/23 |
| 2011/0319068 | A1* | 12/2011 | Kim | H04L 5/001 |
| | | | | 455/422.1 |
| 2018/0337714 | A1* | 11/2018 | Kuchi | H04L 27/2636 |
| 2019/0215823 | A1* | 7/2019 | Kim | H04L 1/0031 |
| 2020/0014457 | A1* | 1/2020 | Tang | H04L 5/0055 |
| 2021/0377992 | A1* | 12/2021 | Elshafie | H04W 72/0453 |
| 2022/0045789 | A1* | 2/2022 | Karmoose | H04W 72/1268 |

FOREIGN PATENT DOCUMENTS

| | | | | |
|---|---|---|---|---|
| WO | 2018056786 | A1 | 3/2018 | |
| WO | WO-2022067749 | A1* | 4/2022 | H04B 7/0456 |

OTHER PUBLICATIONS

3GPP."3rd Generation Partnership Project; Technical Specification Group Radio Access Network; NR: Multiplexing and channel coding(Release 15)" 3GPP TS 38.212 V15.0.01, Mar. 31, 2018(Mar. 31, 2018),section 6.

* cited by examiner $Q_{all}$: total number of REs occupied by K1 second sub-signal $Q_i$: number of REs occupied by i-th second sub-signal in K1 second sub-signals, i=1,..., K1

$$Q_i = \begin{cases} \min(Q_{all}, \text{second value\#i-1}), & i=1 \\ \min(\max(0, Q_{all} - \underbrace{\sum_{l=1}^{i-1} Q_l}_{\text{Second integer}}), \text{second value\#i-1}), & 1 < i \leq K1 \end{cases}$$

$\underbrace{\qquad\qquad\qquad\qquad}_{\text{First integer}}$

FIG. 11

$Q_{all}$: total number of REs occupied by K1 second sub-signal $Q_i$: number of REs occupied by i-th second sub-signal in K1 second sub-signals, i=1,..., K1

$$Q_i = \begin{cases} \min(Q_{all}, \text{second value\#i-1}), & i=K1 \\ \min(\max(0, Q_{all} - \underbrace{\sum_{l=i+1}^{K1} Q_l}_{\text{Fourth integer}}), \text{second value\#i-1}), & 0 < i < K1 \end{cases}$$

$\underbrace{\qquad\qquad\qquad\qquad}_{\text{Third integer}}$

FIG.12

Number of REs occupied by i-th second sub-signal = Second value #i-1,    i=1, ..., K1

FIG.13

▢ Symbol before first DMRS symbol    ▦ Symbol after first DMRS symbol and not carrying DMRS
▨ First DMRS symbol                  ▧ Other DMRS symbols

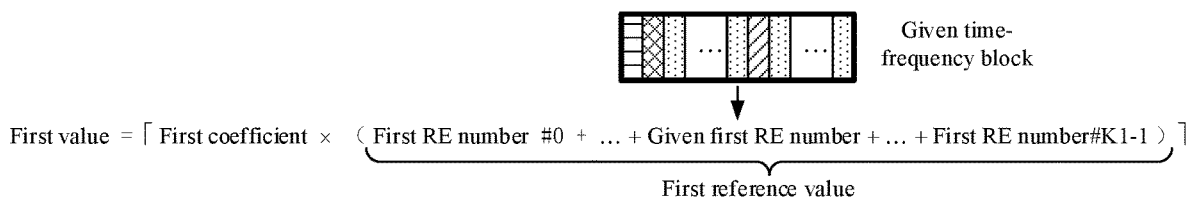

Given time-frequency block

First value = ⌈ First coefficient × (First RE number #0 + ... + Given first RE number + ... + First RE number#K1-1) ⌉

First reference value

FIG.14

First value = ⌈ First coefficient × ( First RE number #0 + ... + Given first RE number + ... + First RE number #K1-1 ) ⌉ − First reference RE number First reference value

FIG.15

☐ Symbol before first DMRS symbol   ▦ Symbol after first DMRS symbol and not carrying DMRS
▨ First DMRS symbol                  ▨ Other DMRS symbols

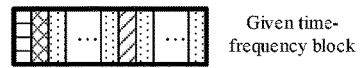

Given time-frequency block

First value = ⌈ First coefficient × (Second RE number #0 + ... + Given second RE number + ... + Second RE number#K1-1 ) × K1/K ⌉

Second reference value

FIG.16

First value = ⌈ First coefficient × (Second RE number #0 + ... + Given second RE number + ... + Second RE number #K1-1) × K1/K ⌉ − First reference RE number Second reference value

FIG.17

☐ Symbol before first DMRS symbol   ▦ Symbol after first DMRS symbol and not carrying DMRS
▨ First DMRS symbol                  ▨ Other DMRS symbols

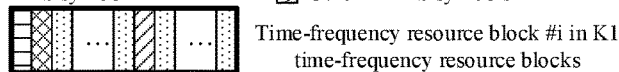

Time-frequency resource block #i in K1 time-frequency resource blocks

Second value #i = ⌈ Second coefficient #i × Reference value #i ⌉,    i=0, ..., K1-1

FIG.18

Second value #i = ⌈ Second coefficient #i × Reference value #i ⌉ − Third reference RE number #i,    i=0, ..., K1-1

FIG.19

☐ Symbol before first DMRS symbol  ▦ Symbol after first DMRS symbol and not carrying DMRS
▨ First DMRS symbol  ▧ Other DMRS symbols Second value #i ⇐ Total number of REs occupied by K1 second sub-signals × Second coefficient #i,
i=0, ..., K1-1

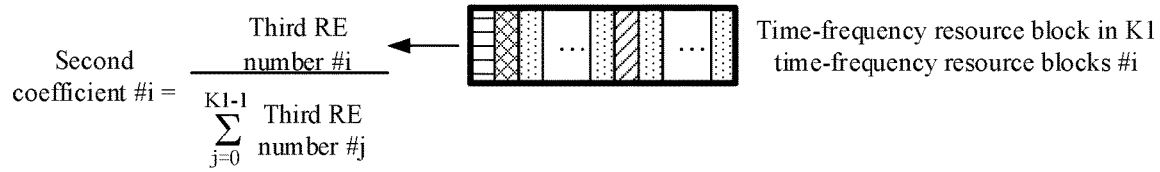

Second coefficient #i = $\dfrac{\text{Third RE number } \#i}{\sum_{j=0}^{K1-1} \text{Third RE number } \#j}$  ⟵  Time-frequency resource block in K1 time-frequency resource blocks #i

FIG. 20

Total number of REs occupied by K1 second sub-signals = min( ⌈ First-type value × First offset ⌉, first value )

FIG. 21

Total number of REs occupied by K1 second sub-signals = min(min(⌈ First-type value × First offset ⌉, First value), $\sum_{i=0}^{K1-1}$ Second value #i)

FIG.22

First-type value = $\dfrac{\text{Number of bits comprised in second bit block}}{\times \text{first-type reference value}}$

FIG.23

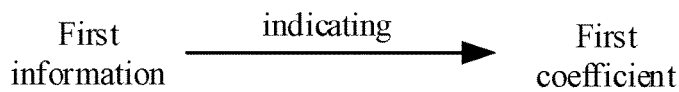

First information —indicating→ First coefficient

FIG.24

First information —indicating→ { First coefficient, K1 second coefficients }

FIG.25

METHOD AND DEVICE IN NODE USED FOR WIRELESS COMMUNICATION

CROSS REFERENCE TO RELATED APPLICATIONS

This application is a continuation of International Application No. PCT/CN2020/076941, filed Feb. 27, 2020, claims the priority benefit of Chinese Patent Application No. 201910172564.6, filed on Mar. 7, 2019, the full disclosure of which is incorporated herein by reference.

BACKGROUND

Technical Field

The present disclosure relates to transmission methods and devices in wireless communication systems, and in particular to a method and device of radio signal transmission in wireless communication systems supporting cellular networks.

Related Art

Compared with conventional 3rd Generation Partner Project (3GPP) Long-term Evolution (LTE) system, 5G system supports more diverse application scenarios, such as enhanced Mobile BroadBand (eMBB), Ultra-Reliable and Low Latency Communications (URLLC), and massive Machine-Type Communications (mMTC). Compared with other application scenarios, URLLC puts forward higher requirements for transmission reliability and delay. 3GPP Release 15 (R15) supports utilizing different Modulation and Coding Scheme (MCS) tables and repetitions to improve the transmission reliability of the URLLC.

In the conventional LTE system, when uplink control information conflicts with an uplink physical-layer data channel in time domain, the uplink control information can be transmitted on the uplink physical-layer data channel. A base station can ensure transmission reliability of the uplink control information by controlling a number of Resource Elements (REs) occupied by the uplink control information on the uplink physical-layer data channel.

SUMMARY

The inventors have found through researches that when uplink control information conflicts with repeatedly transmitted uplink physical-layer data channel in time domain, transmission of the uplink control information on the uplink physical-layer data channel will encounter new problems, such as the uplink control information can be carried on which uplink physical layer data channels, how to allocate the uplink control information in different repetitions, etc.

To address the above problem, the present disclosure provides a solution. It should be noted that the embodiments of a first node in the present disclosure and the characteristics of the embodiments may be applied to a second node if no conflict is incurred, and vice versa. And the embodiments in the present disclosure and the characteristics in the embodiments can be arbitrarily combined if there is no conflict.

The present disclosure provides a method in a first node for wireless communications, comprising:
 receiving a first signaling and a second signaling; and
 transmitting K first radio signals in K time-frequency resource blocks respectively;
herein, each two of the K time-frequency resource blocks are mutually orthogonal in time domain; the K first radio signals respectively comprise K first sub-signals, each of the K first sub-signals carries a first bit block, and the first signaling is used to determine the K time-frequency resource blocks and a size of the first bit block; only K1 first radio signals in the K first radio signals respectively comprise K1 second sub-signals, the K1 second sub-signals carry a second bit block, and the second signaling is used to determine the second bit block; a total number of REs occupied by the K1 second sub-signals is not greater than a first value, and a first coefficient is used to determine the first value; numbers of REs occupied by the K1 second sub-signals are respectively not greater than K1 second values, and K1 second coefficients are respectively used to determine the K1 second values; K and K1 are respectively positive integers greater than 1, and K1 is not greater than K.

In one embodiment, a problem to be solved in the present disclosure is: when uplink control information is carried on a repeatedly transmitted uplink physical layer data channel, how to allocate the uplink control information in different repetitions.

In one embodiment, characteristics of the above method include: the K first sub-signals are K repetitions of the first bit block, and the second bit block carries uplink control information. The above method limits a total number of REs occupied by the second bit block in all repetitions, and limits a number of REs occupied by the second bit block in each repetition, which not only ensures transmission reliability of the uplink control information, but also avoids degradation of transmission performance of the first bit block incurred by excessive REs occupied by the uplink control information in a repetition.

According to one aspect of the present disclosure, it is characterized in that the K1 first radio signals are respectively transmitted in K1 time-frequency resource blocks in the K time-frequency resource blocks, and the first value is related to numbers of REs comprised in only the K1 time-frequency resource blocks in the K time-frequency resource blocks.

According to one aspect of the present disclosure, it is characterized in that the K1 first radio signals are respectively transmitted in K1 time-frequency resource blocks in the K time-frequency resource blocks, and the K1 second values are respectively related to numbers of REs comprised in the K1 time-frequency resource blocks.

According to one aspect of the present disclosure, it is characterized in that any of the K1 second values is related to a total number of REs occupied by the K1 second sub-signals.

According to one aspect of the present disclosure, it is characterized in that a first-type value and a first offset are used to determine a total number of REs occupied by the K1 second sub-signals, and the first-type value is related to a number of REs comprised in each of the K time-frequency resource blocks.

According to one aspect of the present disclosure, comprising:
 receiving first information;
 herein, the first information indicates first coefficient.

According to one aspect of the present disclosure, comprising:
 receiving first information;
 herein, the first information indicates the first coefficient and the K1 second coefficients.

According to one aspect of the present disclosure, comprising:

receiving a second radio signal;

herein, the second signaling is used to determine time-frequency resources occupied by the second radio signal, and the second radio signal is used to generate the second bit block.

According to one aspect of the present disclosure, it is characterized in that the second signaling is used to determine a second radio resource block, and the second radio resource block is used to determine the K1 first radio signals.

In one embodiment, characteristics of the above method include: the second radio resource block is a PUCCH resource reserved for uplink control information, and the above method ensures that uplink control information transmitted on an uplink physical-layer data channel still meets timeline requirements without bringing about extra delay.

According to one aspect of the present disclosure, wherein the first node is a UE.

According to one aspect of the present disclosure, wherein the first node is a relay node.

The present disclosure provides a method in a second node for wireless communications, comprising:

transmitting a first signaling and a second signaling; and receiving K first radio signals in K time-frequency resource blocks respectively;

herein, each two of the K time-frequency resource blocks are mutually orthogonal in time domain; the K first radio signals respectively comprise K first sub-signals, each of the K first sub-signals carries a first bit block, and the first signaling is used to determine the K time-frequency resource blocks and a size of the first bit block; only K1 first radio signals in the K first radio signals respectively comprise K1 second sub-signals, the K1 second sub-signals carry a second bit block, and the second signaling is used to determine the second bit block; a total number of REs occupied by the K1 second sub-signals is not greater than a first value, and a first coefficient is used to determine the first value; numbers of REs occupied by the K1 second sub-signals are respectively not greater than K1 second values, and K1 second coefficients are respectively used to determine the K1 second values; K and K1 are respectively positive integers greater than 1, and K1 is not greater than K.

According to one aspect of the present disclosure, it is characterized in that the K1 first radio signals are respectively transmitted in K1 time-frequency resource blocks in the K time-frequency resource blocks, and the first value is related to numbers of REs comprised in only the K1 time-frequency resource blocks in the K time-frequency resource blocks.

According to one aspect of the present disclosure, it is characterized in that the K1 first radio signals are respectively transmitted in K1 time-frequency resource blocks in the K time-frequency resource blocks, and the K1 second values are respectively related to numbers of REs comprised in the K1 time-frequency resource blocks.

According to one aspect of the present disclosure, it is characterized in that any of the K1 second values is related to a total number of REs occupied by the K1 second sub-signals.

According to one aspect of the present disclosure, it is characterized in that a first-type value and a first offset are used to determine a total number of REs occupied by the K1 second sub-signals, and the first-type value is related to a number of REs comprised in each of the K time-frequency resource blocks.

According to one aspect of the present disclosure, comprising:

transmitting first information;

herein, the first information indicates the first coefficient;

According to one aspect of the present disclosure, comprising:

transmitting first information;

herein, the first information indicates the first coefficient and the K1 second coefficients.

According to one aspect of the present disclosure, comprising:

transmitting a second radio signal;

herein, the second signaling is used to determine time-frequency resources occupied by the second radio signal, and the second radio signal is used to generate the second bit block.

According to one aspect of the present disclosure, it is characterized in that the second signaling is used to determine a second radio resource block, and the second radio resource block is used to determine the K1 first radio signals.

According to one aspect of the present disclosure, wherein the second node is a base station.

According to one aspect of the present disclosure, wherein the second node is a relay node.

The present disclosure provides a first node for wireless communication, comprising:

a first receiver, receiving a first signaling and a second signaling; and a first transmitter, transmitting K first radio signals in K time-frequency resource blocks respectively;

herein, each two of the K time-frequency resource blocks are mutually orthogonal in time domain; the K first radio signals respectively comprise K first sub-signals, each of the K first sub-signals carries a first bit block, and the first signaling is used to determine the K time-frequency resource blocks and a size of the first bit block; only K1 first radio signals in the K first radio signals respectively comprise K1 second sub-signals, the K1 second sub-signals carry a second bit block, and the second signaling is used to determine the second bit block; a total number of REs occupied by the K1 second sub-signals is not greater than a first value, and a first coefficient is used to determine the first value; numbers of REs occupied by the K1 second sub-signals are respectively not greater than K1 second values, and K1 second coefficients are respectively used to determine the K1 second values; K and K1 are respectively positive integers greater than 1, and K1 is not greater than K.

The present disclosure provides a second node for wireless communications, comprising:

a second transmitter, transmitting a first signaling and a second signaling; and a second receiver, receiving K first radio signals in K time-frequency resource blocks respectively;

herein, each two of the K time-frequency resource blocks are mutually orthogonal in time domain; the K first radio signals respectively comprise K first sub-signals, each of the K first sub-signals carries a first bit block, and the first signaling is used to determine the K time-frequency resource blocks and a size of the first bit block; only K1 first radio signals in the K first radio signals respectively comprise K1 second sub-signals, the K1 second sub-signals carry a second bit block, and the second signaling is used to determine the second bit block; a total number of REs occupied by the K1 second sub-signals is not greater than a first value, and a first coefficient is used to determine the first value; numbers of REs occupied by the K1 second sub-signals are respectively not greater than K1 second values, and K1 second coefficients are respectively used to determine the K1 second values; K and K1 are respectively positive integers greater than 1, and K1 is not greater than K.

In one embodiment, the present disclosure has the following advantages over conventional schemes:

when uplink control information is carried on a repeatedly transmitted uplink physical layer data channel, a number of REs occupied by the uplink control information in each repetition is limited while a total number of REs occupied by the uplink control information is limited. This not only ensures transmission reliability of the uplink control information, but also avoids degradation of transmission performance of the uplink physical layer data incurred by excessive REs occupied by the uplink control information in a repetition.

It ensures that the uplink control information transmitted on an uplink physical-layer data channel still meets timeline requirements without bringing about extra delay.

BRIEF DESCRIPTION OF THE DRAWINGS

Other features, objects and advantages of the present disclosure will become more apparent from the detailed description of non-restrictive embodiments taken in conjunction with the following drawings:

FIG. 11 illustrates a schematic diagram of numbers of REs occupied by K1 second sub-signals respectively according to one embodiment of the present disclosure;

FIG. 12 illustrates a schematic diagram of numbers of REs occupied by K1 second sub-signals respectively according to one embodiment of the present disclosure;

FIG. 13 illustrates a schematic diagram of numbers of REs occupied by K1 second sub-signals respectively according to one embodiment of the present disclosure;

FIG. 14 illustrates a schematic diagram of a first value according to one embodiment of the present disclosure;

FIG. 15 illustrates a schematic diagram of a first value according to one embodiment of the present disclosure;

FIG. 16 illustrates a schematic diagram of a first value according to one embodiment of the present disclosure;

FIG. 17 illustrates a schematic diagram of a first value according to one embodiment of the present disclosure;

FIG. 18 illustrates a schematic diagram of K1 second values according to one embodiment of the present disclosure;

FIG. 19 illustrates a schematic diagram of K1 second values according to one embodiment of the present disclosure;

FIG. 20 illustrates a schematic diagram of K1 second values according to one embodiment of the present disclosure;

FIG. 21 illustrates a schematic diagram of a first-type value and a first offset being used to determine a total number of REs occupied by K1 second sub-signals according to one embodiment of the present disclosure;

FIG. 22 illustrates a schematic diagram of a first-type value and a first offset being used to determine a total number of REs occupied by K1 second sub-signals according to one embodiment of the present disclosure;

FIG. 23 illustrates a schematic diagram of a first-type value according to one embodiment of the present disclosure;

FIG. 24 illustrates a schematic diagram of first information according to one embodiment of the present disclosure;

FIG. 25 illustrates a schematic diagram of first information according to one embodiment of the present disclosure;

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
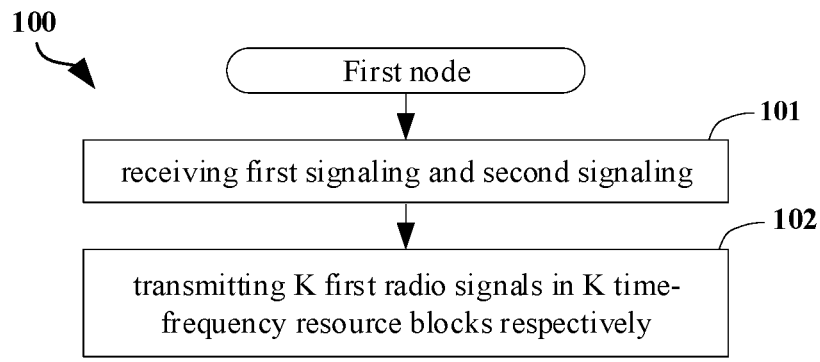
FIG. 1 illustrates a flowchart of a first signaling, a second signaling and K first radio signals according to one embodiment of the present disclosure.

Embodiment 1 illustrates a flowchart of a first signaling, a second signaling and K first radio signals according to one embodiment of the present disclosure, as shown in FIG. 1.

In step 100 illustrated by FIG. 1, each box represents a step, and in particular, the order of steps in boxes does not represent chronological order of characteristics between the steps.

In Embodiment 1, the first node in the present disclosure receives a first signaling and a second signaling in step 101; transmits K first radio signals in K time-frequency resource blocks respectively in step 102; herein, each two of the K time-frequency resource blocks are mutually orthogonal in time domain; the K first radio signals respectively comprise K first sub-signals, each of the K first sub-signals carries a first bit block, and the first signaling is used to determine the K time-frequency resource blocks and a size of the first bit block; only K1 first radio signals in the K first radio signals respectively comprise K1 second sub-signals, the K1 second sub-signals carry a second bit block, and the second signaling is used to determine the second bit block; a total number of REs occupied by the K1 second sub-signals is not greater than a first value, and a first coefficient is used to determine the first value; numbers of REs occupied by the K1 second sub-signals are respectively not greater than K1 second values, and K1 second coefficients are respectively used to determine the K1 second values; K and K1 are respectively positive integers greater than 1, and K1 is not greater than K.

In one embodiment, the first signaling is a physical-layer signaling.

In one embodiment, the first signaling is a dynamic signaling.

In one embodiment, the first signaling is a Radio Resource Control (RRC) signaling.

In one embodiment, the second signaling is a physical-layer signaling.

In one embodiment, the second signaling is a dynamic signaling.

In one embodiment, the resource element is an RE.

In one embodiment, the RE occupies a multicarrier symbol in time domain, and occupies a subcarrier in frequency domain.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the first signaling is used to determine the K time-frequency resource blocks.

In one embodiment, the first signaling indicates the K time-frequency resource blocks.

In one embodiment, each of the K first sub-signals carries a first bit block includes: any of the K first sub-signals is an output after bits in the first bit block sequentially through Cyclic Redundancy Check (CRC) Attachment, Segmentation, Coding block (CB) level CRC Attachment, Channel Coding, Rate Matching, Concatenation, Scrambling, Modulation Mapper, Layer Mapper, transform precoder, Precoding, Resource Element Mapper, Multicarrier Symbol Generation, and Modulation and Upconversion.

In one embodiment, each of the K first sub-signals carries a first bit block includes: any of the K first sub-signals is an output after bits in the first bit block is sequentially through CRC Attachment, Segmentation, CB level CRC Attachment, Channel Coding, Rate Matching, Concatenation, Scrambling, Modulation Mapper, Layer Mapper, Precoding, Resource Element Mapper, Multicarrier Symbol Generation, and Modulation and Upconversion.

In one embodiment, each of the K first sub-signals carries a first bit block includes: the first bit block is used to generate any of the K first sub-signals.

In one embodiment, any of the K first sub-signals is unrelated to the second bit block.

In one embodiment, the K first sub-signals is K repetitions of the first bit block.

In one embodiment, the K first sub-signals correspond to a same Hybrid Automatic Repeat request (HARD) process number.

In one embodiment, the K first sub-signals correspond to a same New Data Indicator (NDI).

In one embodiment, at least two of the K first sub-signals correspond to different Redundancy Versions (RVs).

In one embodiment, at least two of the K first sub-signals correspond to a same RV.

In one embodiment, any two of the K first sub-signals correspond to different RVs.

In one embodiment, any two of the K first sub-signals correspond to a same RV.

In one embodiment, the K first sub-signals correspond to a same Modulation and Coding Scheme (MCS).

In one embodiment, at least two of the K first sub-signals correspond to different MCSs.

In one embodiment, any two of the K first sub-signals correspond to a same DeModulation Reference Signal (DMRS).

In one embodiment, at least two of the K first sub-signals correspond to different DMRS configuration information.

In one embodiment, a Physical Uplink Shared CHannel (PUSCH) where at least one of the K first sub-signals is located does not comprise a DMRS.

In one embodiment, the first bit block comprises at least one bit.

In one embodiment, the first bit block comprises physical layer uplink data.

In one embodiment, the first bit block comprises one Transport Block (TB).

In one embodiment, the first bit block is a TB.

In one embodiment, the first bit block comprises a first information bit block and a first check bit block, the first check bit block is generated by a CRC bit block of the first information bit block.

In one subembodiment of the above embodiment, the first check bit block is a CRC bit block of the first information bit block.

In one subembodiment of the above embodiment, the first check bit block is a bit block after a CRC bit block of the first information bit block is scrambled.

In one embodiment, a size of the first bit block refers to: a number of bits comprised in the first bit block.

In one embodiment, a size of the first bit block refers to: a Transport Block Size (TBS).

In one embodiment, a size of the first bit block refers to: a TBS of a TB comprised in the first bit block.

In one embodiment, the first signaling is used to determine a size of the first bit block.

In one embodiment, the first signaling indicates a size of the first bit block.

In one embodiment, the first signaling implicitly indicates a size of the first bit block.

In one embodiment, a size of the first bit block is related to numbers of REs comprised in the K time-frequency resource blocks.

In one embodiment, a size of the first bit block is related to a number of REs comprised in only an earliest one of the K time-frequency resource blocks.

In one embodiment, a size of the first bit block is related to a total number of REs comprised in the K time-frequency resource blocks.

In one embodiment, a size of the first bit block is related to a scheduled MCS of the K first radio signals.

In one embodiment, K1 is equal to K.

In one embodiment, K1 is less than K.

In one embodiment, the K1 second sub-signals carrying a second bit block includes: any of the K1 second sub-signals carries the second bit block.

In one embodiment, the K1 second sub-signals carrying a second bit block includes: the second bit block comprises S second bit sub-blocks, S being a positive integer greater than 1; any of the K1 second sub-signals carries at least one second bit sub-block in the S second bit sub-block.

In one embodiment, the K1 second sub-signals carrying a second bit block includes: any of the K1 second sub-signals is an output obtained after all or partial bits in the second bit block sequentially through CRC attachment, channel coding, rate matching, a Modulation Mapper, a Layer Mapper, transform precoder, Precoding, a Resource Element Mapper, Generation of multicarrier symbol, and Modulation and Upconversion.

In one embodiment, the K1 second sub-signals carrying a second bit block includes: any of the K1 second sub-signals is an output obtained after all or partial bits in the second bit block sequentially through CRC attachment, channel coding, rate matching, a Modulation Mapper, a Layer Mapper, Precoding, a Resource Element Mapper, Generation of multicarrier symbol, and Modulation and Upconversion.

In one embodiment, the K1 second sub-signals carrying a second bit block includes: all or partial bits in the second bit block are used to generate any of the K1 second sub-signals.

In one embodiment, any of the K1 second sub-signals is unrelated to the first bit block.

In one embodiment, the second bit block comprises at least one bit.

In one embodiment, the second bit block carries Uplink Control Information (UCI).

In one embodiment, the second bit block carries a Hybrid Automatic Repeat reQuest-Acknowledgement (HARQ-ACK).

In one embodiment, the second bit block carries a Scheduling Request (SR).

In one embodiment, the second bit block carries a Channel-state information reference signals Resource Indicator (CRI).

In one embodiment, the second bit block carries Channel-State Information (CSI).

In one embodiment, the CSI comprises one or more of a CRI, a Precoding Matrix Indicator (PMI), a Reference Signal Received Power (RSRP), a Reference Signal Received Quality (RSRQ) and a Channel Quality Indicator (CQI).

In one embodiment, the second bit block comprises a second information bit block and a second check bit block, and the second check bit block is generated by a CRC bit block of the second information bit block.

In one subembodiment of the above embodiment, the second check bit block is a CRC bit block of the second information bit block.

In one subembodiment of the above embodiment, the second check bit block is a bit block after a CRC bit block of the second information bit block is scrambled.

In one embodiment, the second bit block comprises S second bit sub-blocks, S being a positive integer greater than 1; there exists a given second bit sub-block in the S second bit sub-blocks, the given second bit sub-block comprises a given information bit sub-block and a given check bit sub-block, and the given check bit sub-block is generated by a CRC bit block of the given information bit sub-block.

In one embodiment, a total number of REs occupied by the K1 second sub-signals refers to: a sum of numbers of REs respectively occupied by the K1 second sub-signals.

In one embodiment, a total number of REs occupied by the K1 second sub-signals is related to a number of REs comprised in each of the K time-frequency resource blocks.

In one embodiment, a total number of REs occupied by the K1 second sub-signals is equal to the first value.

In one embodiment, a total number of REs occupied by the K1 second sub-signals is less than the first value.

In one embodiment, numbers of REs occupied by the K1 second sub-signals are respectively equal to the K1 second values.

In one embodiment, a number of REs occupied by any of the K1 second sub-signals is equal to a corresponding second value.

In one embodiment, there exists a number of REs occupied by one of the K1 second sub-signals being equal to a corresponding second value.

In one embodiment, a number of REs occupied by any of the K1 second sub-signals is less than a corresponding second value.

In one embodiment, there exists a number of REs occupied by one of the K1 second sub-signals being less than its corresponding second value.

In one embodiment, at least one of the K1 second coefficients is not equal to the first coefficient.

In one embodiment, any of the K1 second coefficients is not equal to the first coefficient.

In one embodiment, at least one of the K1 second coefficients is equal to the first coefficient.

In one embodiment, any of the K1 second coefficients is equal to the first coefficient.

In one embodiment, there exists one of the K1 second coefficients being greater than the first coefficient.

In one embodiment, any of the K1 second coefficients is greater than the first coefficient.

In one embodiment, a total number of REs occupied by the K1 second sub-signals is not greater than a minimum value between a sum of the K1 second values and the first value.

In one embodiment, a total number of REs occupied by the K1 second sub-signals is less than a minimum value between a sum of the K1 second values and the first value.

In one embodiment, a total number of REs occupied by the K1 second sub-signals is equal to a minimum value between a sum of the K1 second values and the first value.

Embodiment 2

Figure 2:
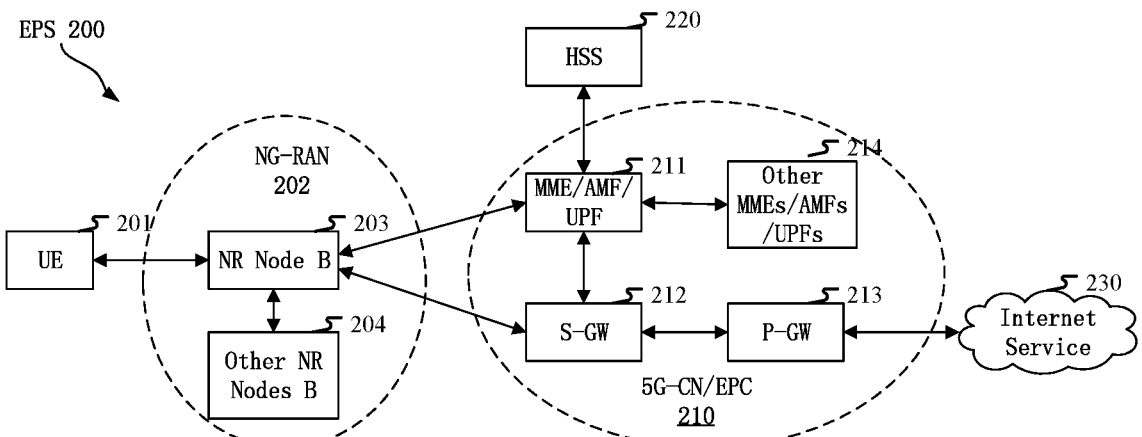
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2.

FIG. 2 is a diagram illustrating a network architecture 200 of Long-Term Evolution (LTE), Long-Term Evolution Advanced (LTE-A) and future 5G systems. The LTE, LTE-A and future 5G systems network architecture 200 may be called an Evolved Packet System (EPS) 200. The EPS 200 may comprise one or more UEs 201, an NG-RAN 202, a 5G-Core Network/Evolved Packet Core (5G-CN/EPC) 210, a Home Subscriber Server (HSS) 220 and an Internet Service 230. Herein, UMTS refers to Universal Mobile Telecommunications System. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane protocol terminations. The gNB 203 may be connected to other gNBs 204 via an X2 interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5G-CN/EPC 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrow-band physical network devices, machine-type communication devices, land vehicles, automobiles, wearable devices, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5G-CN/EPC 210 via an S1 interface. The 5G-CN/EPC 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the 5G-CN/EPC 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Services.

In one embodiment, the second node in the present disclosure comprises the gNB 203.

In one embodiment, the first node in the present disclosure comprises the UE 201.

In one embodiment, the UE in the present disclosure comprises the UE 201.

In one embodiment, the base station in the present disclosure comprises the gNB 203.

In one embodiment, a transmitter of the first signaling in the present disclosure comprises the gNB 203.

In one embodiment, a receiver of the first signaling in the present disclosure comprises the UE 201.

In one embodiment, a transmitter of the second signaling in the present disclosure comprises the gNB 203.

In one embodiment, a receiver of the second signaling in the present disclosure comprises the UE 201.

In one embodiment, a transmitter of the K first radio signals in the present disclosure comprises the UE 201.

In one embodiment, a receiver of the K first radio signals in the present disclosure comprises the gNB 203.

Embodiment 3

Figure 3:
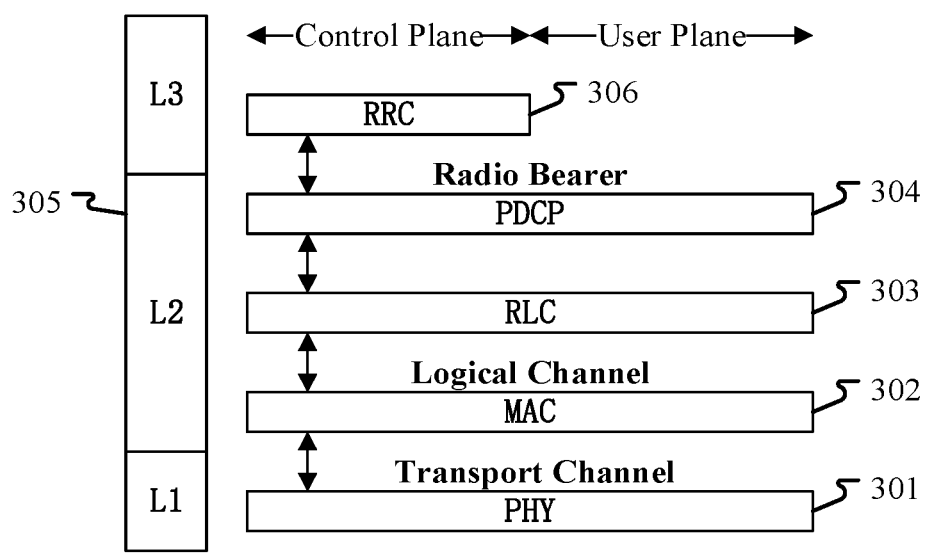
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to one embodiment of the present disclosure, as shown in FIG. 3.

FIG. 3 is a schematic diagram illustrating a radio protocol architecture of a user plane and a control plane. In FIG. 3, the radio protocol architecture for a UE and a gNB is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several protocol layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between UEs various radio resources (i.e., resources block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises an RRC sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first signaling in the present disclosure is generated by the PHY 301.

In one embodiment, the first signaling in the present disclosure is generated by the RRC sublayer 306.

In one embodiment, the first signaling in the present disclosure is generated by the MAC sublayer 302.

In one embodiment, the second signaling in the present disclosure is generated by the PHY 301.

In one embodiment, the K first radio signals in the present disclosure are generated by the PHY 301.

In one embodiment, the second radio signal in the present disclosure is generated by the PHY 301.

In one embodiment, the first information in the present disclosure is generated by the RRC sublayer 306.

In one embodiment, the first information in the present disclosure is generated by the MAC sublayer 302.

Embodiment 4

Figure 4:
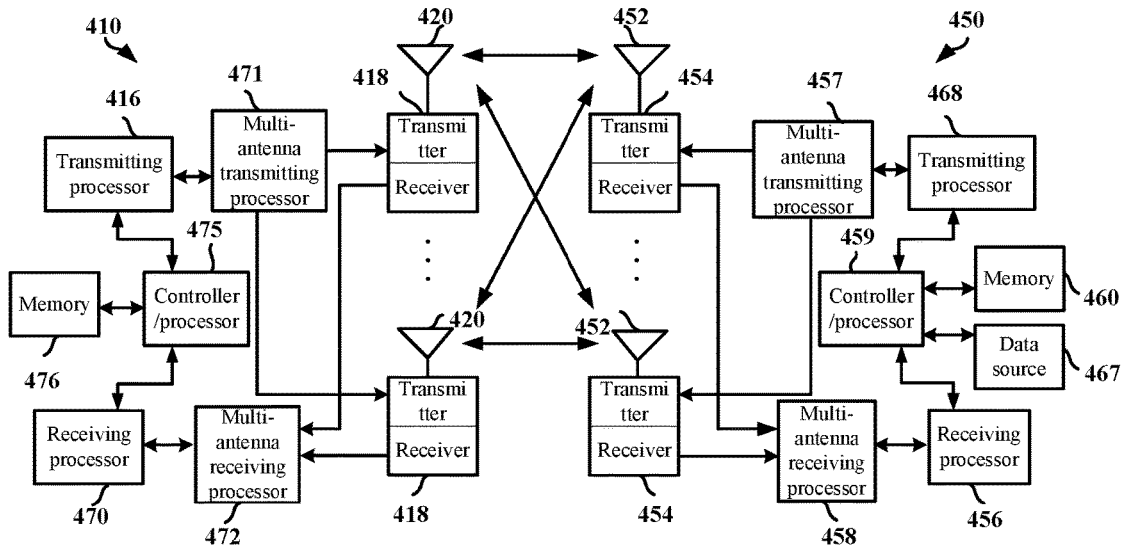
FIG. 4 illustrates a schematic diagram of a first communication device and a second communication device according to one embodiment of the present disclosure.

Embodiment 4 illustrates a schematic diagram of a first communication device and a second communication device according to one embodiment of the present disclosure, as shown in FIG. 4. FIG. 4 is a block diagram of a first communication device 410 in communication with a second communication device 450 in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from the core network is provided to a controller/processor 475. The controller/processor 475 provides a function of the L2 layer. In DL transmission, the controller/processor 475 provides header compression, encryption, packet segmentation and reordering, and multiplexing between a logical channel and a transport channel, and radio resource allocation for the second communication device 450 based on various priorities. The controller/processor 475 is also in charge of HARQ operation, retransmission of a lost packet, and a signaling to the second communication node 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more parallel streams. The transmitting processor 416 then maps each parallel stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted parallel stream. Symbols on each parallel stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In downlink (DL) transmission, the controller/processor 459 provides de-multiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing. The controller/processor 459 also performs error detection using ACK and/or NACK protocols as a way to support HARQ operation.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in DL transmission, the controller/processor 459 performs header compression, encryption, packet segmentation and reordering, and multiplexing between a logical channel and a transport channel based on radio resource allocation of the first communication device 410 so as to provide the L2 layer functions used for the user plane and the control plane. The controller/processor 459 is also responsible for HARQ operation, retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated parallel streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. the controller/processor 475 provides de-multiplexing between a transport channel and a logical channel, packet reassembling, decryption, header decompression, control signal processing so as to recover a higher-layer packet from the second communication device 450. The higher-layer packet coming from the controller/processor 475 may be provided to the core network. The controller/processor 475 can also perform error detection using ACK and/or NACK protocols to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives the first signaling and the second signaling in the present disclosure; and transmits the K first radio signals in the present disclosure in the K time-frequency resource blocks in the present disclosure respectively. Herein, each two of the K time-frequency resource blocks are mutually orthogonal in time domain; the K first radio signals respectively comprise K first sub-signals, each of the K first sub-signals carries a first bit block, and the first signaling is used to determine the K time-frequency resource blocks and a size of the first bit block; only K1 first radio signals in the K first radio signals respectively comprise K1 second sub-signals, the K1 second sub-signals carry a second bit block, and the second signaling is used to determine the second bit block; a total number of REs occupied by the K1 second sub-signals is not greater than a first value, and a first coefficient is used to determine the first value; numbers of REs occupied by the K1 second sub-signals are respectively not greater than K1 second values, and K1 second coefficients are respectively used to determine the K1 second values; K and K1 are respectively positive integers greater than 1, and K1 is not greater than K.

In one embodiment, the second communication device 450 comprises a memory that stores a computer readable instruction program. The computer readable instruction program generates an action when executed by at least one processor. The action includes: receiving the first signaling and the second signaling in the present disclosure; and transmitting the K first radio signals in the present disclosure in the K time-frequency resource blocks in the present disclosure respectively. Herein, each two of the K time-frequency resource blocks are mutually orthogonal in time domain; the K first radio signals respectively comprise K first sub-signals, each of the K first sub-signals carries a first bit block, and the first signaling is used to determine the K time-frequency resource blocks and a size of the first bit block; only K1 first radio signals in the K first radio signals respectively comprise K1 second sub-signals, the K1 second sub-signals carry a second bit block, and the second signaling is used to determine the second bit block; a total number of REs occupied by the K1 second sub-signals is not greater than a first value, and a first coefficient is used to determine the first value; numbers of REs occupied by the K1 second sub-signals are respectively not greater than K1 second values, and K1 second coefficients are respectively used to determine the K1 second values; K and K1 are respectively positive integers greater than 1, and K1 is not greater than K.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits the first signaling and the second signaling in the present disclosure; and receives the K first radio signals in the present disclosure in the K time-frequency resource blocks in the present disclosure respectively. Herein, each two of the K time-frequency resource blocks are mutually orthogonal in time domain; the K first radio signals respectively comprise K first sub-signals, each of the K first sub-signals carries a first bit block, and the first signaling is used to determine the K time-frequency resource blocks and a size of the first bit block; only K1 first radio signals in the K first radio signals respectively comprise K1 second sub-signals, the K1 second sub-signals carry a second bit block, and the second signaling is used to determine the second bit block; a total number of REs occupied by the K1 second sub-signals is not greater than a first value, and a first coefficient is used to determine the first value; numbers of REs occupied by the K1 second sub-signals are respectively not greater than K1 second values, and K1 second coefficients are respectively used to determine the K1 second values; K and K1 are respectively positive integers greater than 1, and K1 is not greater than K.

In one embodiment, the first communication device 410 comprises a memory that stores a computer readable instruction program. The computer readable instruction program generates an action when executed by at least one processor. The action includes: transmitting the first signaling and the second signaling in the present disclosure; and receiving the K first radio signals in the present disclosure in the K time-frequency resource blocks in the present disclosure respectively. Herein, each two of the K time-frequency resource blocks are mutually orthogonal in time domain; the K first radio signals respectively comprise K first sub-signals, each of the K first sub-signals carries a first bit block, and the first signaling is used to determine the K time-frequency resource blocks and a size of the first bit block; only K1 first radio signals in the K first radio signals respectively comprise K1 second sub-signals, the K1 second sub-signals carry a second bit block, and the second signaling is used to determine the second bit block; a total number of REs occupied by the K1 second sub-signals is not greater than a first value, and a first coefficient is used to determine the first value; numbers of REs occupied by the K1 second sub-signals are respectively not greater than K1 second values, and K1 second coefficients are respectively used to determine the K1 second values; K and K1 are respectively positive integers greater than 1, and K1 is not greater than K.

In one embodiment, the second node in the present disclosure comprises the first communication device 410.

In one embodiment, the first node comprises the second communication device 450 in the present disclosure.

In one embodiment, at least one of the antenna 452, the receiver 454, the receiving processor 456, the multi-antenna receiving processor 458, the controller/processor 459, the memory 460, or the data source 467 is used to receive the first signaling in the present disclosure; at least one of the antenna 420, the transmitter 418, the transmitting processor 416, the multi-antenna transmitting processor 471, the controller/processor 475, or the memory 476 is used to transmit the first signaling in the present disclosure.

In one embodiment, at least one of the antenna 452, the receiver 454, the receiving processor 456, the multi-antenna receiving processor 458, the controller/processor 459, the memory 460, or the data source 467 is used to receive the second signaling in the present disclosure; at least one of the antenna 420, the transmitter 418, the transmitting processor 416, the multi-antenna transmitting processor 471, the controller/processor 475, or the memory 476 is used to transmit the second signaling in the present disclosure.

In one embodiment, at least one of the antenna 420, the receiver 418, the receiving processor 470, the multi-antenna receiving processor 472, the controller/processor 475, or the memory 476 is used to receive the K first radio signals in the present disclosure in the K time-frequency resource blocks in the present disclosure respectively; at least one of the antenna 452, the transmitter 454, the transmitting processor 468, the multi-antenna transmitting processor 457, the controller/processor 459, the memory 460, or the data source 467 is used to transmit the K first radio signals in the present disclosure in the K time-frequency resource blocks in the present disclosure respectively.

In one embodiment, at least one of the antenna 452, the receiver 454, the receiving processor 456, the multi-antenna receiving processor 458, the controller/processor 459, the memory 460, or the data source 467 is used to receive the second radio signal of the present disclosure; at least one of the antenna 420, the transmitter 418, the transmitting processor 416, the multi-antenna transmitting processor 471, the controller/processor 475, or the memory 476 is used to transmit the second radio signal of the present disclosure.

In one embodiment, at least one of the antenna 452, the receiver 454, the receiving processor 456, the multi-antenna receiving processor 458, the controller/processor 459, the memory 460, or the data source 467 is used to receive the first information in the present disclosure; at least one of the antenna 420, the transmitter 418, the transmitting processor 416, the multi-antenna transmitting processor 471, the controller/processor 475, or the memory 476 is used to transmit the first information in the present disclosure.

Embodiment 5

Figure 5:
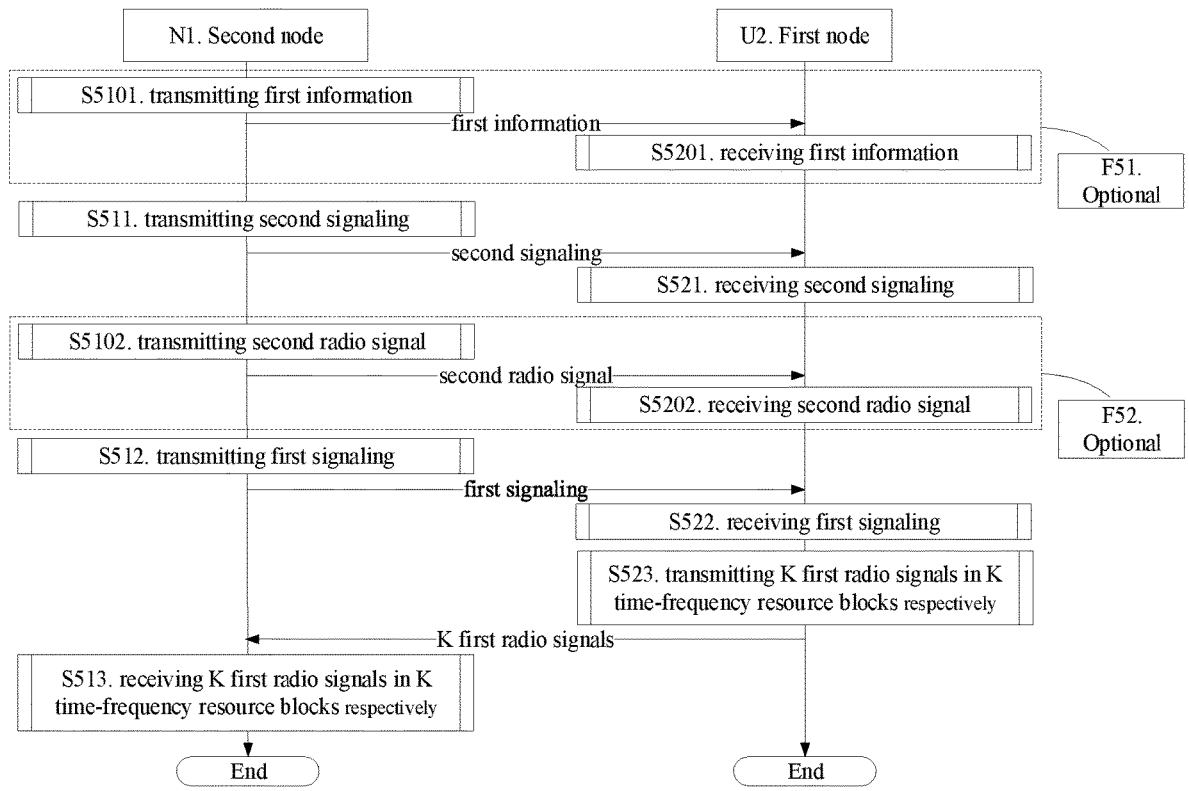
FIG. 5 illustrates a flowchart of transmission according to one embodiment of the present disclosure.

Embodiment 5 illustrates a flowchart of wireless transmissions according to one embodiment in the present disclosure, as shown in FIG. 5. In FIG. 5, a second node N1 and a first node U2 are communication nodes transmitted via air interfaces. In FIG. 5, steps in F51 and F52 are respectively optional.

The second node N1 transmits first information in step S5101; transmits a second signaling in step S511; transmits a second radio signal in step S5102; transmits a first signaling in step S512; and receives K first radio signals in K time-frequency resource blocks respectively in step S513.

The first node U2 receives first information in step S5201; receives a second signaling in step S521; receives a second radio signal in step S5202; receives a first signaling in step S522; and transmits K first radio signals in K time-frequency resource blocks respectively in step S523.

In embodiment 5, each two of the K time-frequency resource blocks are mutually orthogonal in time domain; the K first radio signals respectively comprise K first sub-signals, each of the K first sub-signals carries a first bit block, and the first signaling is used by the first node U2 to determine the K time-frequency resource blocks and a size of the first bit block; only K1 first radio signals in the K first radio signals respectively comprise K1 second sub-signals, the K1 second sub-signals carry a second bit block, and the second signaling is used by the first node U2 to determine the second bit block; a total number of REs occupied by the K1 second sub-signals is not greater than a first value, and a first coefficient is used by the first node U2 to determine the first value; numbers of REs occupied by the K1 second sub-signals are respectively not greater than K1 second values, and K1 second coefficients are respectively used by the first node U2 to determine the K1 second values; K and K1 are respectively positive integers greater than 1, and K1 is not greater than K. The K1 first radio signals are respectively transmitted in K1 time-frequency resource blocks in the K time-frequency resource blocks. The second signaling is used by the first node U2 to determine time-frequency resources occupied by the second radio signal, and the second radio signal is used by the first node U2 to generate the second bit block.

In one embodiment, the first value is related to numbers of REs comprised in only the K1 time-frequency resource blocks in the K time-frequency resource blocks.

In one embodiment, the K1 second values are respectively related to numbers of REs comprised in the K1 time-frequency resource blocks.

In one embodiment, any of the K1 second values is related to a total number of REs occupied by the K1 second sub-signals.

In one embodiment, a first-type value and a first offset are used by the first node U2 to determine a total number of REs occupied by the K1 second sub-signals, and the first-type value is related to a number of REs comprised in each of the K time-frequency resource blocks.

In one embodiment, the first information indicates the first coefficient.

In one embodiment, the first information indicates the first coefficient and the K1 second coefficients.

In one embodiment, the second signaling is used by the first node U2 to determine a second radio resource block, and the second radio resource block is used by the first node U2 to determine the K1 first radio signals.

In one embodiment, the first signaling is transmitted on a downlink physical layer control channel (i.e., a downlink channel only capable of carrying a physical layer signaling).

In one embodiment, the second signaling is transmitted on a downlink physical layer control channel (i.e., a downlink channel only capable of carrying a physical layer signaling).

In one embodiment, the downlink physical-layer control channel is a Physical Downlink Control CHannel (PDCCH).

In one embodiment, the downlink physical-layer control channel is a short PDCCH (sPDCCH).

In one embodiment, the downlink physical layer control channel is a New Radio PDCCH (NR-PDCCH).

In one embodiment, the downlink physical layer control channel is a Narrow Band PDCCH (NB-PDCCH).

In one embodiment, the first signaling is transmitted on a downlink physical layer data channel (i.e., a downlink channel capable of carrying physical layer data).

In one embodiment, the first information is transmitted on a downlink physical layer data channel (i.e., a downlink channel capable of carrying physical layer data).

In one embodiment, the downlink physical layer data channel is a Physical Downlink Shared CHannel (PDSCH).

In one embodiment, the downlink physical layer data channel is a short PDSCH (sPDSCH).

In one embodiment, the downlink physical layer data channel is a New Radio PDSCH (NR-PDSCH).

In one embodiment, the downlink physical layer data channel is a Narrow Band PDSCH (NB-PDSCH).

In one embodiment, the K first radio signals are transmitted on an uplink physical layer data channel (i.e., a uplink channel capable of carrying physical layer data).

In one embodiment, the K first radio signals are respectively transmitted on an uplink physical layer data channel (i.e., a uplink channel capable of carrying physical layer data).

In one embodiment, the uplink physical layer data channel is a PUSCH.

In one subembodiment, the uplink physical-layer data channel is a short PUSCH (sPUSCH).

In one embodiment, the uplink physical layer data channel is a New Radio PUSCH (NR-PUSCH).

In one embodiment, the UL physical-layer data channel is a Narrow Band PUSCH (NB-PUSCH).

Embodiment 6

Figure 6:
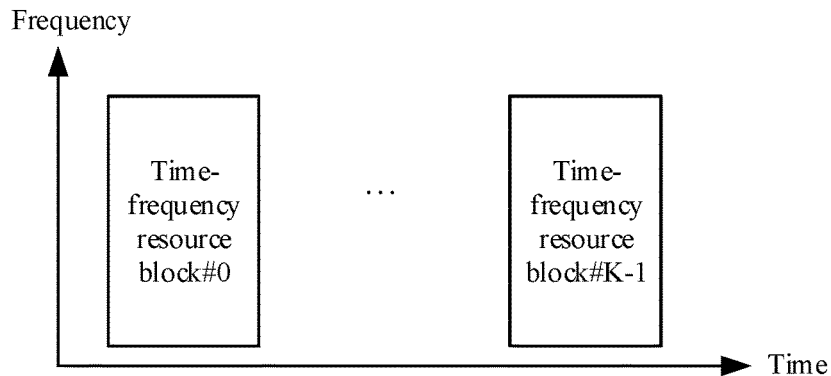
FIG. 6 illustrates a schematic diagram of resource mapping of K time-frequency resource blocks in time-frequency domain according to one embodiment of the present disclosure.

Embodiment 6 illustrates a schematic diagram of resource mapping of K time-frequency resource blocks in time-frequency domain according to one embodiment of the present disclosure, as shown in FIG. 6. In embodiment 6, each two of the K time-frequency resource blocks are mutually orthogonal in time domain. In FIG. 6, indexes of the K time-frequency resource blocks are respectively #0, . . . , #K−1.

In one embodiment, each of the K time-frequency resource blocks comprises at least one RE.

In one embodiment, each of the K time-frequency resource blocks comprises at least one multicarrier symbol in time domain.

In one embodiment, each of the K time-frequency resource blocks comprises at least one consecutive multicarrier symbol in time domain.

In one embodiment, each of the K time-frequency resource blocks comprises at least one subcarrier in frequency domain.

In one embodiment, each of the K time-frequency resource blocks comprises at least one Resource Block (RB) in frequency domain.

In one embodiment, each of the K time-frequency resource blocks comprises at least one Physical Resource Block (PRB) in frequency domain.

In one embodiment, K is equal to 2, and the K time-frequency resource blocks are mutually orthogonal in time domain.

In one embodiment, K is greater than 2, and any two of the K time-frequency resource blocks are mutually orthogonal in time domain.

In one embodiment, the K time-frequency resource blocks are consecutive in time domain.

In one embodiment, there exist two of the K time-frequency resource blocks being inconsecutive in time domain.

In one embodiment, any two of the K time-frequency resource blocks comprises a same number of REs.

In one embodiment, there exist numbers of REs comprised in two of the K time-frequency resource blocks being different.

In one embodiment, numbers of multicarrier symbols comprised in any two of the K time-frequency resource blocks in time domain being the same.

In one embodiment, there exist numbers of multicarrier symbols comprised in two of the K time-frequency resource blocks in time domain being different.

In one embodiment, numbers of subcarriers comprised in any two of the K time-frequency resource blocks in frequency domain being the same.

In one embodiment, any two of the K time-frequency resource blocks occupy same frequency-domain resources.

In one embodiment, the K time-frequency resource blocks belong to a same carrier in frequency domain.

In one embodiment, the K time-frequency resource blocks belong to a same Bandwidth Part (BWP) in frequency domain.

In one embodiment, the K time-frequency resource blocks respectively comprise time-frequency resources allocated to K PUSCHs, and the K first radio signals in the present disclosure are respectively transmitted on the K PUSCHs.

Embodiment 7

Figure 7:
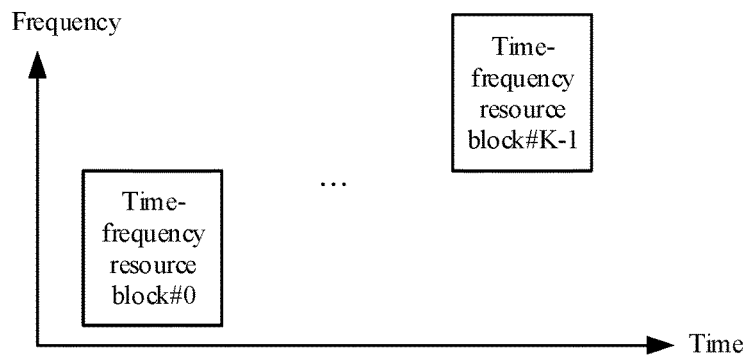
FIG. 7 illustrates a schematic diagram of resource mapping of K time-frequency resource blocks in time-frequency domain according to one embodiment of the present disclosure.

Embodiment 7 illustrates a schematic diagram of a resource mapping of K time-frequency resource blocks in time-frequency domain according to one embodiment of the present disclosure, as shown in FIG. 7.

In one embodiment, there exist numbers of subcarriers comprised in two of the K time-frequency resource blocks being different.

In one embodiment, there exist two of the K time-frequency resource blocks occupying different frequency-domain resources.

In one embodiment, there exist two of the K time-frequency resource blocks occupying mutually-orthogonal frequency-domain resources.

Embodiment 8

Figure 8:
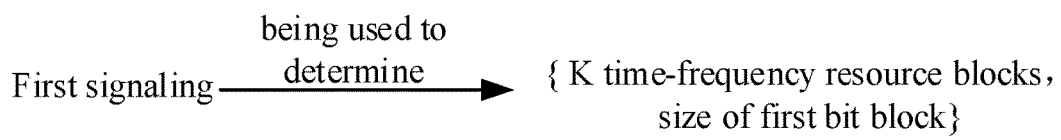
FIG. 8 illustrates a schematic diagram of a first signaling according to one embodiment of the present disclosure.

Embodiment 8 illustrates a schematic diagram of a first signaling according to one embodiment of the present disclosure, as shown in FIG. 8. In embodiment 8, the first signaling is used to determine the K time-frequency resource blocks in the present disclosure and a size of the first bit block in the present disclosure.

In one embodiment, the first signaling is a physical-layer signaling.

In one embodiment, the first signaling is a dynamic signaling.

In one embodiment, the first signaling is a layer 1 (L1) signaling.

In one embodiment, the first signaling is a L1 control signaling.

In one embodiment, the first signaling is a dynamic signaling used for UpLink Grant.

In one embodiment, the first signaling is a dynamic signaling used for Configured UL grant.

In one embodiment, the first signaling is a dynamic signaling used for Configured UL grant activation.

In one embodiment, the first signaling comprises Downlink Control Information (DCI).

In one embodiment, the first signaling comprises DCI for an UpLink Grant.

In one embodiment, the first signaling comprises DCI for a Configured UL grant.

In one embodiment, the first signaling comprises DCI for Configured UL grant activation.

In one embodiment, the first signaling comprises DCI for Configured UL grant Type 2 activation.

In one embodiment, the first signaling is UE-specific.

In one embodiment, the first signaling comprises DCI identified by a Cell Radio Network Temporary Identifier (C-RNTI).

In one embodiment, the first signaling comprises DCI of CRC scrambled by C-RNTI.

In one embodiment, the first signaling comprises DCI identified by a Configured Scheduling (CS)-RNTI.

In one embodiment, the first signaling comprises DCI of CRC scrambled by CS-RNTI.

In one embodiment, the first signaling comprises DCI identified by an MCS-C-RNTI.

In one embodiment, the first signaling comprises DCI of CRC scrambled by an MCS-C-RNTI.

In one embodiment, the first signaling is a higher layer signaling.

In one embodiment, the first signaling is an RRC signaling.

In one embodiment, the first signaling is a Medium Access Control layer Control Element (MAC CE) signaling.

In one embodiment, the first signaling is used to determine the K time-frequency resource blocks.

In one embodiment, the first signaling indicates the K time-frequency resource blocks.

In one embodiment, the first signaling explicitly indicates the K time-frequency resource blocks.

In one embodiment, the first signaling explicitly indicates each of the K time-frequency resource blocks.

In one embodiment, the first signaling explicitly indicates an earliest one of the K time-frequency resource blocks, and the first signaling implicitly indicates a time-frequency resource block other than the earliest one of K time-frequency resource blocks.

In one embodiment, the first signaling comprises a first field, and the first field of the first signaling indicates frequency-domain resources occupied by the K time-frequency resource blocks.

In one subembodiment of the above embodiment, the first field in the first signaling comprises all or partial information in a Frequency domain resource assignment field.

In one subembodiment of the above embodiment, the first field in the first signaling comprises all or partial information in a frequencyDomainAllocation field.

In one embodiment, the first signaling comprises a second field, the second field of the first signaling indicates time-domain resources occupied by the K time-frequency resource blocks.

In one subembodiment of the above embodiment, the second field in the first signaling comprises all or partial information in a Time domain resource assignment field.

In one subembodiment of the above embodiment, the second field in the first signaling comprises all or partial information in a timeDomainOffset field.

In one subembodiment of the above embodiment, the second field in the first signaling comprises all or partial information in a timeDomainAllocation field.

In one subembodiment of the above embodiment, the second field in the first signaling comprises all or partial information in a periodicity field.

In one embodiment, the specific meaning of the Frequency domain resource assignment field can be found in 3GPP TS38.212.

In one embodiment, the specific meaning of the frequencyDomainAllocation field can be found in 3GPP TS38.331.

In one embodiment, the specific meaning of the Time domain resource assignment field can be found in 3GPP TS38.212.

In one embodiment, the specific meaning of the timeDomainOffset field can be found in 3GPP TS38.331.

In one embodiment, the specific meaning of the timeDomainAllocation field can be found in 3GPP TS38.331.

In one embodiment, the specific meaning of the periodicity field can be found in 3GPP TS38.331.

In one embodiment, the first signaling indicates scheduling information of the K first radio signals.

In one embodiment, scheduling information of the K first radio signals comprises one or more of occupied time-domain resources, occupied frequency-domain resources, a scheduled MCS, DMRS configuration information, a HARQ process number, an RV, and a NDI of each of the K first radio signals.

In one embodiment, the DMRS configuration information comprises one or more of occupied time domain resources, occupied frequency domain resources, occupied code domain resources, RS sequence, mapping mode, DMRS type, cyclic shift, Orthogonal Cover Code (OCC), $w_f(k')$ and $w_t(l')$ of the DMRS. The $w_f(k')$ and the $w_t(l')$ are spread spectrum sequences in frequency domain and time domain, the specific meaning of the $w_f(k')$ and the $w_t(l')$ can be found in 3GPP TS38.211, section 6.4.1.

In one embodiment, the first signaling explicitly indicates scheduling information of the K first radio signals.

In one embodiment, the first signaling explicitly indicates scheduling information of an earliest one of the K first radio signals, and the first signaling implicitly indicates scheduling information of a first radio signal other than the earliest one of the K first radio signals.

In one embodiment, the first signaling indicates the K.

In one embodiment, the first signaling explicitly indicates the K.

In one embodiment, the first signaling implicitly indicates the K.

In one embodiment, the first signaling indicates the first offset in the present disclosure.

In one embodiment, the first signaling explicitly indicates the first offset in the present disclosure.

In one embodiment, the first signaling comprises a third offset, and the third field in the first signaling indicates the first offset in the present disclosure.

In one subembodiment of the above embodiment, the third field in the first signaling comprises all or partial information in a beta_offset indicator field.

In one embodiment, the specific meaning of the beta_offset indicator field can be found in 3GPP TS38.212.

In one embodiment, the first offset in the present disclosure is one of P1 candidate offsets, P1 being a positive integer greater than 1; and the first signaling indicates the first offset out of the P1 candidate offsets.

Embodiment 9

Figure 9:
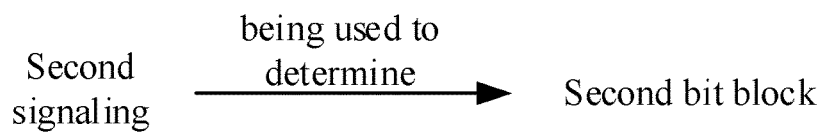
FIG. 9 illustrates a schematic diagram of a second signaling according to one embodiment of the present disclosure.

Embodiment 9 illustrates a schematic diagram of a second signaling according to one embodiment of the present disclosure, as shown in FIG. 9. In Embodiment 9, the second signaling is used to determine the second bit block in the present disclosure.

In one embodiment, the second signaling is a physical-layer signaling.

In one embodiment, the second signaling is a dynamic signaling.

In one embodiment, the second signaling is a L1 signaling.

In one embodiment, the second signaling is a L1 control signaling.

In one embodiment, the second signaling is a dynamic signaling used for Downlink Grant.

In one embodiment, the second signaling comprises DCI.

In one embodiment, the second signaling comprises DCI for a DownLink Grant.

In one embodiment, the second signaling is UE-specific.

In one embodiment, the second signaling comprises DCI identified by a C-RNTI.

In one embodiment, the second signaling comprises DCI of CRC scrambled by C-RNTI.

In one embodiment, the second signaling comprises DCI identified by MCS-C-RNTI.

In one embodiment, the second signaling comprises DCI of CRC scrambled by MCS-C-RNTI.

In one embodiment, the second signaling comprises DCI identified by a Semi-Persistent-Channel State Information-RNTI (SP-CSI-RNTI).

In one embodiment, the second signaling comprises DCI of CRC scrambled by SP-CSI-RNTI.

In one embodiment, the second signaling is a higher-layer signaling.

In one embodiment, the second signaling is an RRC signaling.

In one embodiment, the second signaling is an MAC CE signaling.

In one embodiment, the second signaling being used to determine the second bit block includes: the second signaling is used to determine time-frequency resources occupied by the second radio signal in the present disclosure, and the second radio signal is used to generate the second bit block.

Embodiment 10

Figure 10:
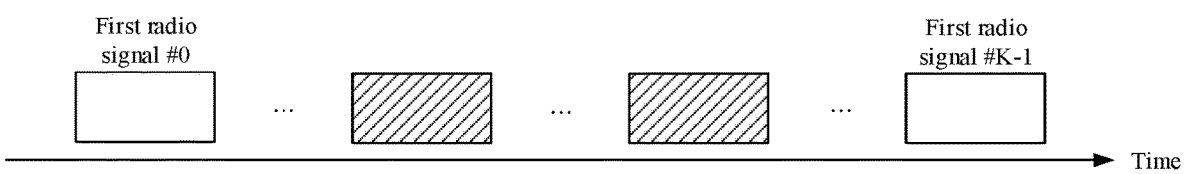
FIG. 10 illustrates a schematic diagram of relations among K first radio signals and K1 first radio signals according to one embodiment of the present disclosure.

Embodiment 10 illustrates a schematic diagram of relations among K first radio signals and K1 first radio signals according to one embodiment of the present disclosure, as shown in FIG. 10. In embodiment 10, only the K1 first radio signals in the K first radio signals respectively comprise the K1 second sub-signals in the present disclosure.

In one embodiment, positions of the K1 radio signals in the K radio signals are consecutive.

In one embodiment, the K radio signals belong to a same slot in time domain.

Embodiment 11

Embodiment 11 illustrates a schematic diagram of numbers of REs occupied by K1 second sub-signals respectively according to one embodiment of the present disclosure, as shown in FIG. 11. In embodiment 11, numbers of REs occupied by the K1 second sub-signals are respectively not greater than the K1 second values in the present disclosure. In FIG. 11, for any positive integer i not greater than K1, a number of REs occupied by an i-th second sub-signal in the K1 second sub-signals is represented by $Q_i$; a total number of REs occupied by the K1 second sub-signals is represented by $Q_{all}$. Indexes of the K1 second values are #0, ..., #K1−1 respectively. An i-th second sub-signal in the K1 second sub-signals corresponds to a second value #i−1.

In embodiment 11, when i is equal to 1, a number of REs occupied by the i-th second sub-signal in the K1 second sub signals is a minimum value between a total number of REs occupied by the K1 second sub-signals and a second value corresponding to the i-th second sub-signal. When i is greater than 1, a number of REs occupied by the i-th second sub-signal in the K1 second sub-signals is a minimum value between a first integer and a second value corresponding to the i-th second sub-signal; the first integer is the maximum value between a difference value obtained by a total number of REs occupied by the K1 second sub-signals minus a second integer and 0, and the second integer is a sum of numbers of REs respectively occupied by a first second sub-signal to an i−1-th second sub-signal in the K1 second sub-signals.

Embodiment 12

Embodiment 12 illustrates a schematic diagram of numbers of REs occupied by K1 second sub-signals respectively according to one embodiment of the present disclosure, as shown in FIG. 12. In FIG. 12, for any positive integer i not greater than K1, a number of REs occupied by an i-th second sub-signal of the K1 second sub-signals is represented by $Q_i$; a total number of REs occupied by the K1 second sub-signals is represented by $Q_{all}$. Indexes of the K1 second values are #0, ..., #K1−1 respectively. An i-th second sub-signal in the K1 second sub-signals corresponds to a second value #i−1.

In embodiment 11, when i is equal to K1, a number of REs occupied by an i-th second sub-signal in the K1 second sub signals is a minimum value between a total number of REs occupied by the K1 second sub-signals and a second value corresponding to the i-th second sub-signal. When i is less than K1, a number of REs occupied by an i-th second sub-signal in the K1 second sub-signals is a minimum value between a third integer and a second value corresponding to the i-th second sub-signal; the third integer is the maximum value between a difference value obtained by a total number of REs occupied by the K1 second sub-signals minus a fourth integer and 0, and the fourth integer is a sum of numbers of REs respectively occupied by an i+1-th second sub-signal to a K1-th second sub-signal in the K1 second sub-signals.

Embodiment 13

Embodiment 13 illustrates a schematic diagram of numbers of REs occupied by K1 second sub-signals respectively according to one embodiment of the present disclosure, as shown in FIG. 13. In embodiment 13, numbers of REs occupied by the K1 second sub-signals are respectively equal to the K1 second values in the present disclosure, and the K1 second coefficients in the present disclosure are respectively used to determine the K1 second values. In FIG.

13, for any positive integer i not greater than K1, an i-th second sub-signal in the K1 second sub-signals corresponds to a second value #i−1.

In one embodiment, numbers of REs occupied by the K1 second sub-signal are respectively equal to a product of a corresponding second coefficient and a total number of REs occupied by the K1 second sub-signals.

In one embodiment, a number of REs occupied by any of the K1 second sub-signals is equal to a product of a corresponding second coefficient and a total number of REs occupied by the K1 second sub-signals being rounded up or rounded down to an integer.

In one embodiment, there exists a number of REs occupied by one of the K1 second sub-signals being equal to a product of a corresponding second coefficient and a total number of REs occupied by the K1 second sub-signals being rounded up to an integer.

In one embodiment, there exists a number of REs occupied by one of the K1 second sub-signals being equal to a product of a corresponding second coefficient and a total number of REs occupied by the K1 second sub-signals being rounded down to an integer.

In one embodiment, number(s) of REs occupied by first K1−1 second sub-signal(s) in the K1 second sub-signals is (are respectively) equal to a product of a corresponding second coefficient and a total number of REs occupied by the K1 second sub-signals being rounded down to an integer, and a number of REs occupied by a last one of the K1 second sub-signals is equal to a total number of REs occupied by the K1 second sub-signals minus a sum of number(s) of REs respectively occupied by the first K1−1 second sub-signal(s).

In one embodiment, number(s) of REs occupied by first K1−1 second sub-signal(s) in the K1 second sub-signals is (are respectively) equal to a product of a corresponding second coefficient and a total number of REs occupied by the K1 second sub-signals being rounded up to an integer, and a number of REs occupied by a last one of the K1 second sub-signals is equal to a total number of REs occupied by the K1 second sub-signals minus a sum of number(s) of REs respectively occupied by the first K1−1 second sub-signal(s).

In one embodiment, number(s) of REs occupied by first K1−1 second sub-signal(s) in the K1 second sub-signals is (are respectively) equal to a positive integer closet to a product of a corresponding second coefficient and a total number of REs occupied by the K1 second sub-signals, and a number of REs occupied by a last one of the K1 second sub-signals is equal to a total number of REs occupied by the K1 second sub-signals minus a sum of number(s) of REs respectively occupied by the first K1−1 second sub-signal(s).

In one embodiment, a given value being rounded up to an integer is equal to a minimum integer not less than the given value.

In one embodiment, a given value being rounded down to an integer is equal to a maximum integer not greater than the given value.

Embodiment 14

Embodiment 14 illustrates a schematic diagram of a first value according to one embodiment of the present disclosure, as shown in FIG. 14. In embodiment 14, the first value is equal to the first coefficient in the present disclosure multiplied by a first reference value and being rounded up to an integer; the first reference value is related to numbers of REs comprised in only the K1 time-frequency resource blocks in the K time-frequency resource blocks in the present disclosure. The first reference value is equal to a sum of K1 first RE numbers, and the K1 first RE numbers are respectively related to numbers of REs comprised in the K time-frequency resource blocks. Each of the K1 time-frequency resource block respectively corresponds to K1 PUSCHs, and the K1 first radio signals in the present disclosure are respectively transmitted on the K1 PUSCHs. In FIG. 14, indexes of the K1 first RE numbers are respectively #0, . . . , #K1−1.

In one embodiment, the first value is a positive integer.

In one embodiment, the first coefficient is a non-negative real number.

In one embodiment, the first coefficient is a non-negative real number not greater than 1.

In one embodiment, the first coefficient is a positive real number.

In one embodiment, the first coefficient is a positive real number not greater than 1.

In one embodiment, the first coefficient is one of 0.5, 0.65, 0.8 or 1.

In one embodiment, the first coefficient is a higher-layer parameter scaling.

In one embodiment, the specific meaning of the higher-layer parameter scaling can be found in 3GPP TS38.212, section 6.3.2 and 3GPP TS38.331.

In one embodiment, the first coefficient is $\alpha$.

In one embodiment, the specific meaning of the $\alpha$ can be found in 3GPP TS38.212, section 6.3.2.

In one embodiment, the first value is linearly correlated with the first coefficient.

In one embodiment, the first value is unrelated to a number of REs comprised in any of the K time-frequency resource blocks not belonging to the K1 time-frequency resource blocks.

In one embodiment, the first value is related to a number of REs comprised in any of the K1 time-frequency resource blocks.

In one embodiment, the first value is related to a number of REs not allocated to a reference signal comprised in any of the K1 time-frequency resource blocks.

In one embodiment, the first value is related to a total number of REs comprised in the K time-frequency resource blocks.

In one embodiment, the first value is related to a total number of REs not allocated to a reference signal comprised in the K1 time-frequency resource blocks.

In one embodiment, the reference signal comprises a DMRS.

In one embodiment, the reference signal comprises a Phase-Tracking Reference Signal (PTRS).

In one embodiment, the first reference value is unrelated to a number of REs comprised in any of K time-frequency resource blocks in the present disclosure not belonging to the K1 time-frequency resource blocks.

In one embodiment, the first reference value is related to a total number of REs not allocated to a reference signal comprised in the K1 time-frequency resource blocks.

In one embodiment, the first reference value is equal to a total number of REs not allocated to a reference signal comprised in the K1 time-frequency resource blocks.

In one embodiment, the K1 first RE numbers are respectively related to numbers of REs not allocated to a reference signal comprised in the K1 time-frequency resource blocks.

In one embodiment, for a given one of the K1 first RE numbers, the given first RE number is equal to a total number of REs allocated to a corresponding PUSCH not allocated to a PTRS located on all multicarrier symbols of a DMRS after an earliest DMRS symbol of the corresponding PUSCH and not comprising the corresponding PUSCH in time domain in a multicarrier symbol allocated to the corresponding PUSCH.

In one subembodiment of the above embodiment, in FIG. 14, the given first RE number is equal to a total number of REs allocated to the corresponding PUSCH not allocated to a PTRS on a multicarrier symbol represented by all dot-filled rectangles in a given time-frequency resource block.

In one subembodiment of the above embodiment, the given first RE number is any of the K1 first RE numbers.

In one embodiment, for a given one of the K1 first RE numbers, the given first RE number is equal to a total number of REs allocated to a corresponding PUSCH not allocated to a PTRS located on all multicarrier symbols of a DMRS not comprising the corresponding PUSCH in a multicarrier symbol allocated to the corresponding PUSCH.

In one subembodiment of the above embodiment, in FIG. 14, the given first RE number is equal to a total number of REs allocated to the corresponding PUSCH not allocated to a PTRS on a multicarrier symbol represented by all dot-filled rectangles and horizontal line-filled rectangles in a given time-frequency resource block.

In one subembodiment of the above embodiment, the given first RE number is any of the K1 first RE numbers.

Embodiment 15

Embodiment 15 illustrates a schematic diagram of a first value according to one embodiment of the present disclosure, as shown in FIG. 15. In embodiment 15, the first value is equal to the first coefficient in the present disclosure multiplied by the first reference value in embodiment 14 and being rounded up to an integer, and then minus a first reference RE number, and the first reference RE number is a non-negative integer.

In one embodiment, the first reference RE number is a number of REs occupied by an HARQ-ACK in the K1 time-frequency resource blocks.

In one embodiment, the first reference RE number is a sum of a number of REs occupied by an HARQ-ACK in the K1 time-frequency resource blocks and a number of REs occupied by CSI part 1 in the K1 time-frequency resource blocks.

In one embodiment, the specific meaning of the CSI part 1 can be found in 3GPP TS38.212.

Embodiment 16

Embodiment 16 illustrates a schematic diagram of a first value according to one embodiment of the present disclosure, as shown in FIG. 16. In embodiment 16, the first value is equal to a value obtained by the first coefficient in the present disclosure multiplied by a second reference value, then multiplied by a ratio of K1 in the present disclosure to K in the present disclosure and then rounded up to an integer. The second reference value is related to numbers of REs comprised in the K time-frequency resource blocks in the present disclosure. The second reference value is equal to a sum of K1 second RE numbers, and the K1 second RE numbers are respectively related to numbers of REs comprised in the K time-frequency resource blocks. Each of the K time-frequency resource blocks respectively corresponds to K PUSCHs, and the K first radio signals in the present disclosure are respectively transmitted on the K PUSCHs. In FIG. 16, indexes of the K1 second RE numbers are respectively #0, . . . , #K1−1.

In one embodiment, the first value is related to a ratio of K1 to K.

In one embodiment, the first value is related to a number of REs comprised in any of the K time-frequency resource blocks.

In one embodiment, the first value is related to a number of REs not allocated to a reference signal comprised in any of the K time-frequency resource blocks.

In one embodiment, the first value is related to a total number of REs comprised in the K time-frequency resource blocks.

In one embodiment, the first value is related to a total number of REs not allocated to a reference signal comprised in the K time-frequency resource blocks.

In one embodiment, the second reference value is related to a total number of REs not allocated to a reference signal comprised in the K time-frequency resource blocks.

In one embodiment, the second reference value is equal to a total number of REs not allocated to a reference signal comprised in the K time-frequency resource blocks.

In one embodiment, the K second RE numbers are respectively related to numbers of REs not allocated to a reference signal comprised in the K time-frequency resource blocks.

In one embodiment, for a given second RE number of the K second RE numbers, the given second RE number is equal to a total number of REs allocated to a corresponding PUSCH and not allocated to a PTRS located on all multicarrier symbols of a DMRS after an earliest DMRS symbol of the corresponding PUSCH and not comprising the corresponding PUSCH in time domain in a multicarrier symbol allocated to the corresponding PUSCH.

In one subembodiment of the above embodiment, in FIG. 16, the given second RE number is equal to a total number of REs allocated to the corresponding PUSCH and not allocated to a PTRS on a multicarrier symbol represented by all dot-filled rectangles in a given time-frequency resource block, and the given time-frequency resource block is one of the K time-frequency resource blocks corresponding to the given second RE number.

In one subembodiment of the above embodiment, the given second RE number is any of the K second RE numbers.

In one embodiment, for a given second RE number of the K second RE numbers, the given second RE number is equal to a total number of REs allocated to a corresponding PUSCH and not allocated to a PTRS located on all multicarrier symbols of a DMRS not comprising the corresponding PUSCH in a multicarrier symbol allocated to the corresponding PUSCH.

In one subembodiment of the above embodiment, in FIG. 16, the given second RE number is equal to a total number of REs allocated to the corresponding PUSCH and not allocated to a PTRS on a multicarrier symbol represented by all dot-filled rectangles and horizontal line-filled rectangles in a given time-frequency resource block, and the given time-frequency resource block is one of the K time-frequency resource blocks corresponding to the given second RE number.

In one subembodiment of the above embodiment, the given second RE number is any of the K second RE numbers.

Embodiment 17

Embodiment 17 illustrates a schematic diagram of a first value according to one embodiment of the present disclosure, as shown in FIG. 17. In embodiment 17, the first value is equal to a value obtained by the first coefficient in the present disclosure multiplied by the second reference value in embodiment 16, then multiplied by a ratio of K1 in the present disclosure to K in the present disclosure, then rounded up to an integer, and then minus the first reference RE in embodiment 15.

Embodiment 18

Embodiment 18 illustrates a schematic diagram of K1 second values according to one embodiment of the present disclosure, as shown in FIG. 18. In embodiment 18, the K1 second coefficients in the present disclosure are respectively used to determine the K1 second values. Each of the K1 second value respectively corresponds to K1 reference values, and any of the K1 second values is equal to a corresponding second coefficient multiplied by a corresponding reference values and being rounded up to an integer; the K1 reference values are respectively related to numbers of REs comprised in the K time-frequency resource blocks in the present disclosure. Each of the K1 time-frequency resource block respectively corresponds to K1 PUSCHs, and the K1 first radio signals in the present disclosure are respectively transmitted on the K1 PUSCHs. In FIG. 18, indexes of the K1 second values, the K1 second coefficients and the K1 reference values are respectively #0, . . . , #K1−1. For any non-negative integer i less than K1, a second value #i corresponds to a second coefficient #i and a reference value #i.

In one embodiment, the K1 second values are positive integers respectively.

In one embodiment, there exist two unequal second values in the K1 second values.

In one embodiment, any two of the K1 second values are equal.

In one embodiment, the K1 second coefficients are respectively non-negative real numbers.

In one embodiment, the K1 second coefficients are respectively non-negative real numbers not greater than 1.

In one embodiment, the K1 second coefficients are respectively positive real numbers.

In one embodiment, the K1 second coefficients are respectively positive real numbers not greater than 1.

In one embodiment, there exist two unequal second coefficients in the K1 second coefficients In one embodiment, any two of the K1 second coefficients are equal.

In one embodiment, any of the K1 second coefficients is one of 0.5, 0.65, 0.8 or 1.

In one embodiment, each of the K1 second coefficients is configured by higher-layer signaling.

In one embodiment, each of the K1 second coefficients is configured by a higher-layer parameter.

In one embodiment, each of the K1 second coefficients is semi-statically configured.

In one embodiment, any of the K1 second coefficients is unrelated to a number of REs comprised in any of the K time-frequency resource blocks in the present disclosure.

In one embodiment, any of the K1 second coefficients is unrelated to K1.

In one embodiment, any of the K1 second coefficients is unrelated to K.

In one embodiment, any of the K1 second coefficients is unrelated to a ratio of K1 to K.

In one embodiment, the K1 second values are linearly correlated with the K1 second coefficients respectively.

In one embodiment, any of the K1 second values is unrelated to a number of REs comprised in any of the K time-frequency resource blocks not belonging to the K1 time-frequency resource blocks.

In one embodiment, any of the K1 second values is unrelated to a total number of REs occupied by the K1 second sub-signals in the present disclosure.

In one embodiment, the K1 second values are respectively related to numbers of REs not allocated to a reference signal comprised in the K time-frequency resource blocks.

In one embodiment, the K1 reference values are respectively related to numbers of REs not allocated to a reference signal comprised in the K time-frequency resource blocks.

In one embodiment, any of the K1 reference values is equal to a number of REs comprised in a corresponding time-frequency resource block not allocated to a reference signal.

In one embodiment, for a given reference value in the K1 reference values, the given reference value is equal to a total number of REs allocated to a corresponding PUSCH and not allocated to a PTRS located on all multicarrier symbols of a DMRS after an earliest DMRS symbol of the corresponding PUSCH and not comprising the corresponding PUSCH in time domain in a multicarrier symbol allocated to the corresponding PUSCH.

In one subembodiment of the above embodiment, in FIG. 18, a reference number #i is equal to a total number of REs allocated to a PUSCH #i and not allocated to a PTRS on a multicarrier symbol represented by all dot-filled rectangles in time-frequency resource block #i; the time-frequency resource block #i is one of the K1 time-frequency resource blocks corresponding to the reference value #i, and the PUSCH #i is one of the K1 PUSCHs corresponding to the time-frequency resource block #i.

In one subembodiment of the above embodiment, the given reference value is any of the K1 given reference values.

In one embodiment, for a given reference value of the K1 reference values, the given reference value is equal to a total number of REs allocated to a corresponding PUSCH and not allocated to a PTRS located on all multicarrier symbols of a DMRS not comprising the corresponding PUSCH in a multicarrier symbol allocated to the corresponding PUSCH.

In one subembodiment of the above embodiment, in FIG. 18, a reference value #i is equal to a total number of REs allocated to a PUSCH #i and not allocated to a PTRS on a multicarrier symbol represented by all dot-filled rectangles and horizontal line-filled rectangles in a time-frequency resource block #i, the time-frequency resource block #i is one of the K1 time-frequency resource blocks corresponding to the reference value #i, and the PUSCH #i is one of the K1 PUSCHs corresponding to the time-frequency resource block #i.

In one subembodiment of the above embodiment, the given reference value is any of the K1 given reference values.

Embodiment 19

Embodiment 19 illustrates a schematic diagram of K1 second values according to one embodiment of the present disclosure, as shown in FIG. 19. In embodiment 19, the K1 second coefficients in the present disclosure are respectively used to determine the K1 second values, each of the K1 second values respectively correspond to the K1 reference values in embodiment 8, and each of the K1 second values respectively corresponds to K1 third reference RE numbers.

Any of the K1 second values is equal to a corresponding second coefficient multiplied by a corresponding reference value then being rounded up to an integer, and then minus a corresponding third reference RE number. The K1 third reference RE numbers are non-negative integers respectively.

In one embodiment, any of the K1 third reference RE numbers is a number of REs occupied by a time-frequency resource block corresponding to an HARQ-ACK.

In one embodiment, any of the K1 third reference RE numbers is a sum of numbers of REs occupied by time-frequency resource blocks corresponding to an HARQ-ACK and CSI part 1.

Embodiment 20

Embodiment 20 illustrates a schematic diagram of K1 second values according to one embodiment of the present disclosure, as shown in FIG. 20. In embodiment 20, the K1 second coefficients in the present disclosure are respectively used to determine the K1 second values. Any of the K1 second values is equal to a product of a corresponding second coefficient and a total number of REs occupied by the K1 second sub-signals being rounded up or rounded down to an integer. Each of the K1 second coefficients respectively correspond to the K1 third RE numbers, and any of the K1 second coefficients is a ratio of a sum of a corresponding third RE number and the K1 third RE numbers; the K1 third RE numbers are respectively positive integers. The K1 third RE numbers are respectively related to numbers of REs comprised in the K time-frequency resource blocks in the present disclosure. Each of the K1 time-frequency resource blocks respectively corresponds to K1 PUSCHs, and the K1 first radio signals in the present disclosure are respectively transmitted on the K1 PUSCHs. In FIG. 20, indexes of the K1 second values, the K1 second coefficients and the K1 third RE numbers are respectively #0, . . . , #K1−1. For any non-negative integer i less than K1, a second value #i corresponds to a second coefficient #i and a third RE number #i.

In one embodiment, any of the K1 second values is linearly correlated to a total number of REs occupied by the K1 second sub-signals.

In one embodiment, any of the K1 second values is equal to a product of a corresponding second coefficient and a total number of REs occupied by the K1 second sub-signals.

In one embodiment, there exists one of the K1 second values being equal to a product of a corresponding second coefficient and a total number of REs occupied by the K1 second sub-signals being rounded up to an integer.

In one embodiment, there exists one of the K1 second values being equal to a product of a corresponding second coefficient and a total number of REs occupied by the K1 second sub-signals being rounded down to an integer.

In one embodiment, first K1−1 second value(s) of the K1 second values is (are respectively) equal to a product of a corresponding second coefficient and a total number of REs occupied by the K1 second sub-signals being rounded down to an integer, and a last one of the K1 second values is equal to a total number of REs occupied by the K1 second sub-signals minus a sum of the first K1−1 second value(s).

In one embodiment, first K1−1 second value(s) of the K1 second values is (are respectively) equal to a product of a corresponding second coefficient and a total number of REs occupied by the K1 second sub-signals being rounded up to an integer, and a last one of the K1 second values is equal to a total number of REs occupied by the K1 second sub-signals minus a sum of the first K1−1 second value(s).

In one embodiment, first K1−1 second value(s) of the K1 second values is (are respectively) equal to a positive integer closet to a product of a corresponding second coefficient and a total number of REs occupied by the K1 second sub-signals, and a last one of the K1 second values is equal to a total number of REs occupied by the K1 second sub-signals minus a sum of the first K1−1 second value(s).

In one embodiment, the first signaling in the present disclosure is used to determine the K1 second coefficients.

In one embodiment, the first signaling in the present disclosure implicitly indicates the K1 second coefficients.

In one embodiment, the first signaling in the present disclosure and the second signaling in the present disclosure are used together to determine the K1 second coefficients.

In one embodiment, any of the K1 second coefficients is related to K1.

In one embodiment, any of the K1 second coefficients is 1/K1.

In one embodiment, the K1 second coefficients are respectively related to numbers of REs comprised in the K1 time-frequency resource blocks.

In one embodiment, the K1 second coefficients are respectively related to numbers of REs not allocated to a reference signal comprised in the K time-frequency resource blocks.

In one embodiment, the K1 third RE numbers are respectively related to numbers of REs not allocated to a reference signal comprised in the K1 time-frequency resource blocks.

In one embodiment, the K1 third RE numbers are respectively numbers of REs not allocated to a reference signal comprised in the K1 time-frequency resource blocks.

In one embodiment, for a given one of the K1 third RE numbers, the given third RE number is equal to a total number of REs allocated to a corresponding PUSCH and not allocated to a PTRS located on all multicarrier symbols of a DMRS after an earliest DMRS symbol of the corresponding PUSCH and not comprising the corresponding PUSCH in time domain in a multicarrier symbol allocated to the corresponding PUSCH.

In one subembodiment of the above embodiment, in FIG. 20, a third RE number #i is equal to a total number of REs allocated to a PUSCH #i and not allocated to a PTRS on a multicarrier symbol represented by all dot-filled rectangles in time-frequency resource block #i;
the time-frequency resource block #i is one of the K1 time-frequency resource blocks corresponding to the third RE number #i, and the PUSCH #i is one of the K1 PUSCHs corresponding to the time-frequency resource block #i.

In one subembodiment of the above embodiment, the given third RE number is any of the K1 third RE numbers.

In one embodiment, for a given one of the K1 third RE numbers, the given third RE number is equal to a total number of REs allocated to a corresponding PUSCH and not allocated to a PTRS on all multicarrier symbols of a DMRS not comprising the corresponding PUSCH in a multicarrier symbol allocated to the corresponding PUSCH.

In one subembodiment of the above embodiment, in FIG. 20, a third RE number #i is equal to a total number of REs allocated to a PUSCH #i and not allocated to a PTRS on a multicarrier symbol represented by all dot-filled rectangles and horizontal line-filled rectangles in time-frequency resource block #i; the time-frequency resource block #i is one of the K1 time-frequency resource blocks corresponding to the third RE number #i, and the PUSCH #i is one of the K1 PUSCHs corresponding to the time-frequency resource block #i.

In one subembodiment of the above embodiment, the given third RE number is any of the K1 third RE numbers.

Embodiment 21

Embodiment 21 illustrates a schematic diagram of a first-type value and a first offset being used to determine a total number of REs occupied by K1 second sub-signals according to one embodiment of the present disclosure, as shown in FIG. 21. In embodiment 21, a total number of REs occupied by the K1 second sub-signals is a minimum value between a rounded up product of the first-type value multiplied by the first offset and the first value in the present disclosure.

In one embodiment, a total number of REs occupied by the K1 second sub-signals is related to a number of REs comprised in each of the K time-frequency resource blocks.

In one embodiment, a total number of REs occupied by the K1 second sub-signals is related to a number of REs comprised in any of the K1 time-frequency resource blocks, and is related to a number of REs comprised in any of the K time-frequency resource blocks not belonging to the K1 time-frequency resource blocks.

In one embodiment, a total number of REs occupied by the K1 second sub-signals is related to a number of REs comprised in any of the K time-frequency resource blocks not allocated to a reference signal.

In one embodiment, a total number of REs occupied by the K1 second sub-signals is related to a total number of REs comprised in the K time-frequency resource blocks.

In one embodiment, a total number of REs occupied by the K1 second sub-signals is related to a total number of REs comprised in the K time-frequency resource blocks not allocated to a reference signal.

In one embodiment, the first offset is a non-negative real number.

In one embodiment, the first offset is greater than 1.
In one embodiment, the first offset is equal to 1.
In one embodiment, the first offset is less than 1.
In one embodiment, the first offset is equal to 0.
In one embodiment, the first offset is greater than 0.
In one embodiment, the first offset is $\beta_{offset}^{HARQ-ACK}$.
In one embodiment, the specific meaning of the $\beta_{offset}^{HARQ-ACK}$ can be found in 3GPP TS38.212, section 6.3.2.

In one embodiment, the first offset is $\beta_{offset}^{CSI-1}$.
In one embodiment, the specific meaning of the $\beta_{offset}^{CSI-1}$ can be found in 3GPP TS38.212, section 6.3.2.

In one embodiment, the first offset is $\beta_{offset}^{CSI-2}$.
In one embodiment, the specific meaning of the $\beta_{offset}^{CSI-2}$ can be found in 3GPP TS38.212, section 6.3.2.

In one embodiment, the first offset is $\beta_{offset}^{AUL-UCI}$.
In one embodiment, the specific meaning of the $\beta_{offset}^{AUL-UCI}$ can be found in 3GPP TS36.212 (V15.3.0), section 5.2.

In one embodiment, the first offset is determined by higher-layer parameters betaOffsetACK-Index1, betaOffsetACK-Index2 and betaOffsetACK-Index3.

In one embodiment, the specific meanings of the higher-layer parameters betaOffsetACK-Index1, betaOffsetACK-Index2 and betaOffsetACK-Index3 can be found in 3GPP TS38.213, section 9.3 and 3GPP TS38.331.

In one embodiment, the first offset is determined by higher-layer parameters betaOffsetCSI-Part1-Index1 and betaOffsetCSI-Part1-Index2.

In one embodiment, the specific meanings of the higher-layer parameters betaOffsetCSI-Part1-Index1 and betaOffsetCSI-Part1-Index2 can be found in 3GPP TS38.213, section 9.3 and 3GPP TS38.331.

In one embodiment, the first offset is determined by higher-layer parameters betaOffsetCSI-Part2-Index1 and betaOffsetCSI-Part2-Index2.

In one embodiment, the specific meanings of the higher-layer parameters betaOffsetCSI-Part2-Index1 and betaOffsetCSI-Part2-Index2 can be found in 3GPP TS38.213, section 9.3 and 3GPP TS38.331.

Embodiment 22

Embodiment 22 illustrates a schematic diagram of a first-type value and a first offset being used to determine a total number of REs occupied by K1 second sub-signals according to one embodiment of the present disclosure, as shown in FIG. 22. In embodiment 22, a total number of REs occupied by the K1 second sub-signals is a minimum value among a rounded up product of the first-type value and the first offset, the first value in the present disclosure and a sum of the K1 second values in the present disclosure. In FIG. 22, indexes of the K1 second values are respectively #0, . . . , #K1−1.

Embodiment 23

Embodiment 23 illustrates a schematic diagram of a first-type value according to one embodiment of the present disclosure, as shown in FIG. 23. In Embodiment 23, the first-type value is equal to a product of a first-type reference value and a number of bits comprised in the second bit block in the present disclosure; the first-type reference value is related to a number of REs comprised in any of the K time-frequency resource blocks in the present disclosure, and the first-type reference value is related to a number of bits comprised in the first bit block in the present disclosure.

In one embodiment, the first-type reference value is a positive real number.

In one embodiment, the first-type reference value is related to a total number of REs not allocated to a reference signal comprised in the K time-frequency resource blocks.

In one embodiment, the first-type reference value is proportional to a total number of REs not allocated to a reference signal comprised in the K time-frequency resource blocks.

In one embodiment, the first-type reference value is inversely proportional to a number of bits comprised in the first bit block.

In one subembodiment of the above embodiment, the first-type value is equal to $$\frac{\sum_{l=0}^{N_{symb,all}^{PUSCH\_K}-1} M_{sc}^{UCI}(l)}{\sum_{r=0}^{C_{UL-SCH}-1} K_r},$$

the $C_{UL-SCH}$ is a number of code-blocks comprised in the first bit block, the $K_r$ is a total number of bits comprised in an r-th code-block, the $N_{symb,all}^{PUSCH\_K}$ is a total number of multicarrier symbols allocated to K PUSCHs, and the $M_{sc}^{UCI}(l)$ is a number of REs that can be occupied by UCI on an l-th multicarrier symbol. The K first radio signals in the present disclosure are respectively transmitted on the K PUSCHs. The specific meanings of the $C_{UL-SCH}$, the $K_r$ and the $M_{sc}^{UCI}(l)$ can be found in 3GPP TS38.212, section 6.3.2.4.

Embodiment 24

Embodiment 24 illustrates a schematic diagram of first information according to one embodiment of the present disclosure, as shown in FIG. 24. In Embodiment 24, the first information indicates the first coefficient in the present disclosure.

In one embodiment, the first information indicates only the first coefficient in the first coefficient and the K1 second coefficients in the present disclosure.

In one embodiment, the first information explicitly indicates the first coefficient.

In one embodiment, the first information is carried by a higher-layer signaling.

In one embodiment, the first information is carried by an RRC signaling.

In one embodiment, the first information is carried by a MAC CE signaling.

In one embodiment, the first information comprises all or partial information in uci-OnPUSCH field.

In one embodiment, the first information comprises all or partial information in a uci-OnPUSCH field in a PUSCH-Config IE.

In one embodiment, the first information comprises all or partial information in a uci-OnPUSCH field in a ConfiguredGrantConfig IE.

In one embodiment, the first information comprises all or partial information of a UCI-OnPUSCH.

In one embodiment, the first information comprises all or partial information of a CG-UCI-OnPUSCH.

In one embodiment, the specific meaning of the uci-OnPUSCH field can be found in 3GPP TS38.331.

In one embodiment, the specific diagram of the PUSCH-Config IE can be found in 3GPP TS38.331.

In one embodiment, the specific meaning of the ConfiguredGrantConfig IE can be found in 3GPP TS38.331.

In one embodiment, the specific meaning of the uci-OnPUSCH can be found in 3GPP TS38.331.

In one embodiment, the specific meaning of the CG-UCI-OnPUSCH can be found in 3GPP TS38.331.

Embodiment 25

Embodiment 25 illustrates a schematic diagram of first information according to one embodiment of the present disclosure, as shown in FIG. 25. In Embodiment 25, the first information indicates the first coefficient in the present disclosure and the K1 second coefficients in the present disclosure.

In one embodiment, the first information explicitly indicates a first coefficient and the K1 second coefficients.

In one embodiment, the first information indicates the first coefficient and a first reference coefficient, and any of the K1 second coefficients is equal to the first reference coefficient.

Embodiment 26

Figure 26:
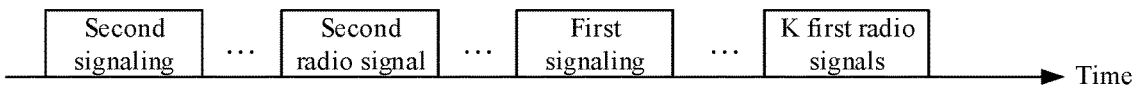
FIG. 26 illustrates a schematic diagram of timing relations among a first signaling, a second signaling, K first radio signals and a second radio signal according to one embodiment of the present disclosure.

Embodiment 26 illustrates a schematic diagram of timing relations among a first signaling, a second signaling, K first radio signals and a second radio signal according to one embodiment of the present disclosure, as shown in FIG. 26. In embodiment 26, the second signaling is earlier than the second radio signal in time domain, the second radio signal is earlier than the first signaling in time domain, and the first signaling is earlier than the K first radio signals in time domain.

In one embodiment, the second signaling is not later than the first signaling in time domain.

In one embodiment, a start time of time-domain resources occupied by the second signaling is not later than a start time of time-domain resources occupied by the first signaling.

In one embodiment, an end time of time-domain resources occupied by the second signaling is not later than an end time of time-domain resources occupied by the first signaling.

In one embodiment, an end time of time-domain resources occupied by the second signaling is not later than a start time of time-domain resources occupied by the first signaling.

In one embodiment, the second radio signal is not later than the K first radio signals in time domain.

In one embodiment, an end time of time-domain resources occupied by the second radio signal is not later than a start time of time-domain resources occupied by the K first radio signals.

Embodiment 27

Figure 27:
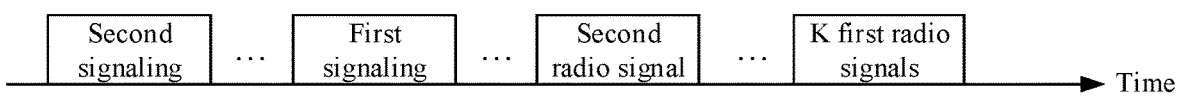
FIG. 27 illustrates a schematic diagram of timing relations among a first signaling, a second signaling, K first radio signals and a second radio signal according to one embodiment of the present disclosure.

Embodiment 27 illustrates a schematic diagram of timing relations among a first signaling, a second signaling, K first radio signals and a second radio signal according to one embodiment of the present disclosure, as shown in FIG. 27. In embodiment 27, the second signaling is earlier than the first signaling in time domain, the first signaling is earlier than the second radio signal in time domain, and the second radio signal is earlier than the K first radio signals in time domain.

Embodiment 28

Figure 28:
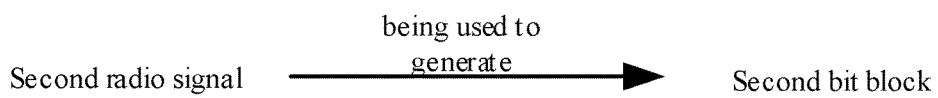
FIG. 28 illustrates a schematic diagram of a second radio signal being used to generate a second bit block according to one embodiment of the present disclosure.

Embodiment 28 illustrates a schematic diagram of a second radio signal being used to generate a second bit block according to one embodiment of the present disclosure, as shown in FIG. 28. In Embodiment 28, the second signaling in the present disclosure indicates scheduling information of the second radio signal, and the third bit block indicates whether the second radio signal is correctly received.

In one embodiment, the second signaling indicates time-frequency resources occupied by the second radio signal.

In one embodiment, the second signaling explicitly indicates time-frequency resources occupied by the second radio signal.

In one embodiment, the second signaling implicitly indicates time-frequency resources occupied by the second radio signal.

In one embodiment, scheduling information of the second radio signal comprises one or more of occupied time-domain resources, occupied frequency-domain resources, a scheduled MCS, configuration information of DMRS, an HARQ process number, an RV and an NDI.

In one embodiment, the second radio signal being used to generate the second bit block includes: the second bit block indicates whether the second radio signal is correctly received.

In one embodiment, the second radio signal being used to generate the second bit block includes: the second radio signal comprises a third bit block, and the third bit block comprises a TB; the second bit block indicates whether the third bit block is correctly received.

In one embodiment, the second radio signal is transmitted on a downlink physical layer data channel (i.e., a downlink channel capable of bearing physical layer data).

In one embodiment, the second radio signal is transmitted on a PDSCH.

Embodiment 29

Figure 29:
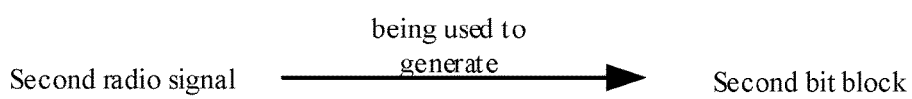
FIG. 29 illustrates a schematic diagram of a second radio signal being used to generate a second bit block according to one embodiment of the present disclosure.

Embodiment 29 illustrates a schematic diagram of a second radio signal being used to generate a second bit block according to one embodiment of the present disclosure, as shown in FIG. 29. In embodiment 29, the second radio signal comprises a first reference signal, and the second signaling in the present disclosure indicates configuration information of the first reference signal. A measurement performed on the first reference signal is used to generate the second bit block.

In one embodiment, the second radio signal comprises a DMRS.

In one embodiment, the second radio signal comprises a Channel-State Information Reference Signal (CSI-RS).

In one embodiment, configuration information of the first reference signal comprises one or more of occupied time domain resources, occupied frequency domain resources, occupied code domain resources, RS sequence, mapping mode, DMRS type, cyclic shift, Orthogonal Cover Code (OCC), $w_f(k')$ and $w_t(l')$. The $w_f(k')$ and the $w_t(l')$ are spread spectrum sequences in frequency domain and time domain, the specific meaning of the $w_f(k')$ and the $w_t(l')$ can be found in 3GPP TS38.211, section 7.4.1.

In one embodiment, a measurement performed on the first reference signal is used to generate a first channel quality, and the second bit block carries the first channel quality.

In one subembodiment of the above embodiment, the first channel quality comprises a CQI.

In one subembodiment of the above embodiment, the first channel quality comprises a CRI.

In one subembodiment of the above embodiment, the first channel quality comprises a PMI.

In one subembodiment of the above embodiment, the first channel quality comprises an RSRP.

In one subembodiment of the above embodiment, the first channel quality comprises an RSRQ.

In one embodiment, the second signaling indicates an index of a reference signal resource corresponding to the first reference signal.

In one embodiment, reference signal resources corresponding to the first reference signal comprise a CSI-RS resource.

In one embodiment, the second radio signal being used to generate the second bit block includes: a measurement performed on the second radio signal is used to generate the second bit block.

Embodiment 30

Figure 30:
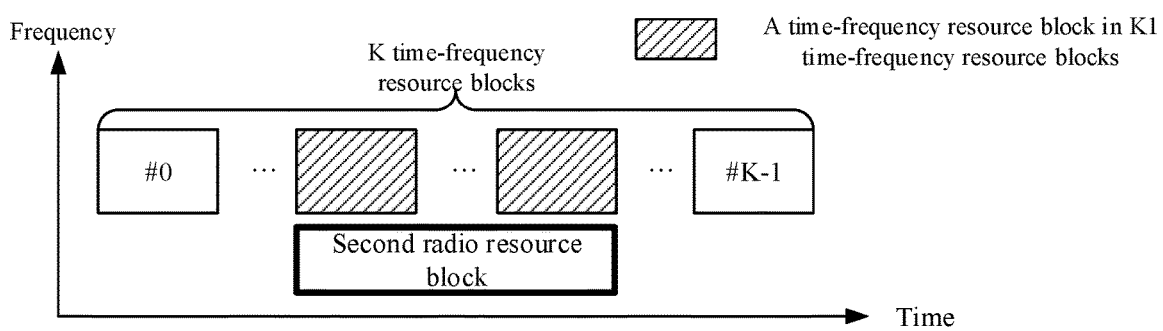
FIG. 30 illustrates a schematic diagram of a second radio resource block being used to determine K1 first radio signals according to one embodiment of the present disclosure.

Embodiment 30 illustrates a schematic diagram of a second radio resource block being used to determine K1 first radio signals according to one embodiment of the present disclosure, as shown in FIG. 30.

In one embodiment, the second radio resource block comprises a time-frequency resource block.

In one embodiment, the second radio resource block comprise time-frequency resources and code-domain resources.

In one embodiment, the code-domain resource comprises one or more of pseudo-random sequences, low-PAPR sequences, a cyclic shift, an Orthogonal Cover Code (OCC), an OCC length, an OCC index, an orthogonal sequence, $r_{u,v}^{(\alpha,\delta)}(n)$, $w_i(m)$, and $w_n(m)$. The $r_{u,v}^{(\alpha,\delta)}(n)$ is a pseudo-random sequence or a low-PAPR sequence, and the $w_i(m)$ and the $w_n(m)$ are respectively orthogonal sequences. The specific meanings of the $r_{u,v}^{(\alpha,\delta)}(n)$, the $w_i(m)$ and the $w_n(m)$ can be found in 3GPP TS38.211, section 6.3.2.

In one embodiment, the second radio resource block comprises at least one RE in time-frequency domain.

In one embodiment, the second radio resource block comprises at least one multi-carrier symbol in time domain.

In one embodiment, the second radio resource block comprises at least one consecutive multi-carrier symbol in time domain.

In one embodiment, the second radio resource block comprises at least one sub-carrier symbol in frequency domain.

In one embodiment, the second radio resource block comprises at least one RB in frequency domain.

In one embodiment, the second radio resource block comprises at least one PRB in frequency domain.

In one embodiment, the second radio resource block is a Physical Uplink Control CHannel (PUCCH) resource.

In one embodiment, the second radio resource block is reserved for the second bit block.

In one embodiment, the second radio resource block is reserved for information carried by the second bit block.

In one embodiment, the second signaling in the present disclosure indicates the second radio resource block.

In one embodiment, the second signaling in the present disclosure explicitly indicates the second radio resource block.

In one embodiment, the second signaling in the present disclosure implicitly indicates the second radio resource block.

In one embodiment, the second signaling in the present disclosure comprises a fourth field, and the fourth field in the second signaling indicates the second radio resource block.

In one subembodiment of the above embodiment, the fourth field in the second signaling comprises all or partial information in a PUCCH resource indicator field.

In one subembodiment of the above embodiment, the fourth field in the second signaling comprises all or partial information in a PDSCH-to-HARQ_feedback timing indicator field.

In one embodiment, the specific meaning of the PUCCH resource indicator field can be found in 3GPP TS38.212.

In one embodiment, the specific meaning of the DSCH-to-HARQ_feedback timing indicator field can be found in 3GPP TS38.212.

In one embodiment, the second signaling indicates an index of the second radio resource block, and an index of the second radio resource block is an index of PUCCH resource.

In one embodiment, the second radio resource block being used to determine the K1 first radio signals includes: the second radio resource block is used to determine positions of the K1 radio signals in the K radio signals.

In one embodiment, the second radio resource block being used to determine the K1 first radio signals includes: the second radio resource block is used to determine the K1 time-frequency resource blocks.

In one embodiment, the second radio resource block being used to determine the K1 first radio signals includes: the second radio resource block is used to determine positions of the K1 time-frequency resource blocks in the K time-frequency resource blocks.

In one embodiment, the second radio resource block being used to determine the K1 first radio signals includes: a start time of time-domain resources occupied by the K1 first radio signals is not earlier than a start time of time-domain resources occupied by the second radio resource block.

In one embodiment, the second radio resource block being used to determine the K1 first radio signals includes: an end time of time-domain resources occupied by the K1 first radio signals is not later than an end time of time-domain resources occupied by the second radio resource block.

In one embodiment, the second radio resource block being used to determine the K1 first radio signals includes: a start time of time-domain resources occupied by the K1 time-frequency resource blocks is not earlier than a start time of time-domain resources occupied by the second radio resource block.

In one embodiment, the second radio resource block being used to determine the K1 first radio signals includes: an end time of time-domain resources occupied by the K1 time-frequency resource blocks is not later than an end time of time-domain resources occupied by the second radio resource block.

Embodiment 31

Figure 31:
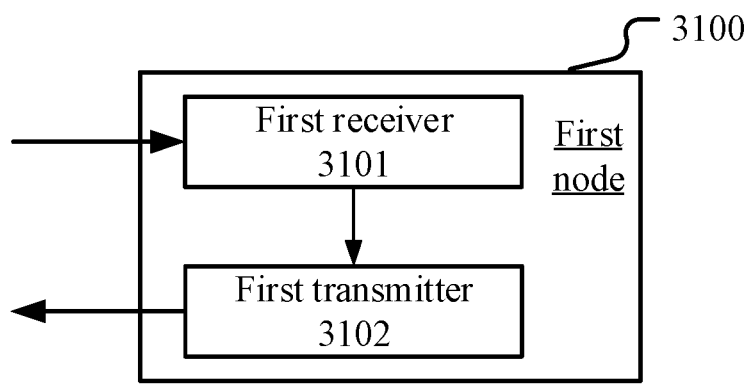
FIG. 31 illustrates a structure block diagram of a processing device in a first node according to one embodiment of the present disclosure.

Embodiment 31 illustrates a structure block diagram of a processing device in a first node according to one embodiment of the present disclosure, as shown in FIG. 31. In FIG. 31, a processing device 3100 in a first node device comprises a first receiver 3101 and a first transmitter 3102.

In Embodiment 31, a first receiver 3101 receives a first signaling and a second signaling; a first transmitter 3102 transmits K first radio signals in K time-frequency resource blocks respectively.

In embodiment 31, each two of the K time-frequency resource blocks are mutually orthogonal in time domain; the K first radio signals respectively comprise K first sub-signals, each of the K first sub-signals carries a first bit block, and the first signaling is used to determine the K time-frequency resource blocks and a size of the first bit block; only K1 first radio signals in the K first radio signals respectively comprise K1 second sub-signals, the K1 second sub-signals carry a second bit block, and the second signaling is used to determine the second bit block; a total number of REs occupied by the K1 second sub-signals is not greater than a first value, and a first coefficient is used to determine the first value; numbers of REs occupied by the K1 second sub-signals are respectively not greater than K1 second values, and K1 second coefficients are respectively used to determine the K1 second values; K and K1 are respectively positive integers greater than 1, and K1 is not greater than K.

In one embodiment, the K1 first radio signals are respectively transmitted in K1 time-frequency resource blocks in the K time-frequency resource blocks, and the first value is related to numbers of REs comprised in only the K1 time-frequency resource blocks in the K time-frequency resource blocks.

In one embodiment, the K1 first radio signals are respectively transmitted in K1 time-frequency resource blocks in the K time-frequency resource blocks, and the K1 second values are respectively related to numbers of REs comprised in the K1 time-frequency resource blocks.

In one embodiment, any of the K1 second values is related to a total number of REs occupied by the K1 second sub-signals.

In one embodiment, a first-type value and a first offset are used to determine a total number of REs occupied by the K1 second sub-signals, and the first-type value is related to a number of REs comprised in each of the K time-frequency resource blocks.

In one embodiment, the first receiver 3101 receives first information; herein, the first information indicates the first coefficient.

In one embodiment, the first receiver 3101 receives first information; herein, the first information indicates the first coefficient and the K1 second coefficients.

In one embodiment, the first receiver 3101 receives a second radio signal; herein, the second signaling is used to determine time-frequency resources occupied by the second radio signal, and the second radio signal is used to generate the second bit block.

In one embodiment, the second signaling is used to determine a second radio resource block, and the second radio resource block is used to determine the K1 first radio signals.

In one embodiment, the first node 3100 is a UE.

In one embodiment, the first node 3100 is a relay node.

In one embodiment, the first receiver 3101 comprises at least one of the antenna 452, the receiver 454, the receiving processor 456, the multi-antenna receiving processor 458, the controller/processor 459, the memory 460, or the data source 467 in Embodiment 4.

In one embodiment, the first transmitter 3102 comprises at least one of the antenna 452, the transmitter 454, the transmitting processor 468, the multi-antenna transmitting processor 457, the controller/processor 459, the memory 460, or the data source 467 in Embodiment 4.

Embodiment 32

Figure 32:
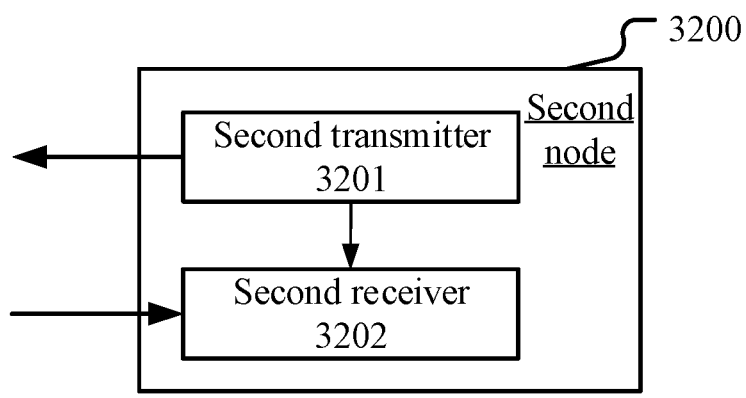
FIG. 32 illustrates a structure block diagram of a processing device in a second node according to one embodiment of the present disclosure.

Embodiment 32 illustrates a structure block diagram of a processing device in a second node according to one embodiment of the present disclosure; as shown in FIG. 32. In FIG. 32, a processing device 3200 in a second node device comprises a second transmitter 3201 and a second receiver 3202.

In Embodiment 32, a second transmitter 3201 transmits a first signaling and a second signaling; a second receiver 3202 receives K first radio signals in K time-frequency resource blocks respectively.

In embodiment 32, each two of the K time-frequency resource blocks are mutually orthogonal in time domain; the K first radio signals respectively comprise K first sub-signals, each of the K first sub-signals carries a first bit block, and the first signaling is used to determine the K time-frequency resource blocks and a size of the first bit block; only K1 first radio signals in the K first radio signals respectively comprise K1 second sub-signals, the K1 second sub-signals carry a second bit block, and the second signaling is used to determine the second bit block; a total number of REs occupied by the K1 second sub-signals is not greater than a first value, and a first coefficient is used to determine the first value; numbers of REs occupied by the K1 second sub-signals are respectively not greater than K1 second values, and K1 second coefficients are respectively used to determine the K1 second values; K and K1 are respectively positive integers greater than 1, and K1 is not greater than K.

In one embodiment, the K1 first radio signals are respectively transmitted in K1 time-frequency resource blocks in the K time-frequency resource blocks, and the first value is related to numbers of REs comprised in only the K1 time-frequency resource blocks in the K time-frequency resource blocks.

In one embodiment, the K1 first radio signals are respectively transmitted in K1 time-frequency resource blocks in the K time-frequency resource blocks, and the K1 second values are respectively related to numbers of REs comprised in the K1 time-frequency resource blocks.

In one embodiment, any of the K1 second values is related to a total number of REs occupied by the K1 second sub-signals.

In one embodiment, a first-type value and a first offset are used to determine a total number of REs occupied by the K1 second sub-signals, and the first-type value is related to a number of REs comprised in each of the K time-frequency resource blocks.

In one embodiment, the second transmitter 3201 transmits first information; herein, the first information indicates the first coefficient.

In one embodiment, the second transmitter 3201 transmits first information; herein, the first information indicates the first coefficient and the K1 second coefficients.

In one embodiment, the second transmitter 3201 transmits a second radio signal; herein, the second signaling is used to determine time-frequency resources occupied by the second radio signal, and the second radio signal is used to generate the second bit block.

In one embodiment, the second signaling is used to determine a second radio resource block, and the second radio resource block is used to determine the K1 first radio signals.

In one embodiment, the second node 3200 is a base station.

In one embodiment, the second node 3200 is a relay node.

In one embodiment, the second transmitter 3201 comprises at least one of the antenna 420, the transmitter 418, the transmitting processor 416, the multi-antenna transmitting processor 471, the controller/processor 475, or the memory 476 in Embodiment 4.

In one embodiment, the second receiver 3202 comprises at least one of the antenna 420, the receiver 418, the receiving processor 470, the multi-antenna receiving processor 472, the controller/processor 475, the memory 476 in Embodiment 4.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, receiving a first signaling and a second signaling, the first signaling being a physical-layer signaling, the second signaling being a physical-layer signaling; and
a first transmitter, transmitting K first radio signals in K time-frequency resource blocks respectively, the K first radio signals are respectively transmitted on a Physical Uplink Shared Channel (PUSCH);
wherein each two of the K time-frequency resource blocks are mutually orthogonal in time domain; the K first radio signals respectively comprise K first sub-signals, each of the K first sub-signals carries a first bit block, the first bit block comprises one Transport Block (TB), the K first sub-signals are K repetitions of the first bit block, at least two of the K first sub-signals correspond to different Redundancy Versions (RVs), and the first signaling is used to determine the K time-frequency resource blocks and a size of the first bit block; only K1 first radio signals in the K first radio signals respectively comprise K1 second sub-signals, the K1 second sub-signals carry a second bit block, the second bit block carries Uplink Control Information (UCI), and the second signaling is used to determine the second bit block; a total number of Resource Elements (REs) occupied by the K1 second sub-signals is not greater than a first value, a first coefficient is used to determine the first value, and a higher-layer signaling indicates the first coefficient; numbers of REs occupied by the K1 second sub-signals are respectively not greater than K1 second values, and K1 second coefficients are respectively used to determine the K1 second values, and each of the K1 second coefficients is configured by a higher-layer signaling; K and K1 are respectively positive integers greater than 1, and K1 is not greater than K.

2. The first node according to claim 1, wherein the K1 first radio signals are respectively transmitted in K1 time-frequency resource blocks in the K time-frequency resource blocks, and the first value is related to numbers of REs comprised in only the K1 time-frequency resource blocks in the K time-frequency resource blocks.

3. The first node according to claim 1, wherein the K1 first radio signals are respectively transmitted in K1 time-frequency resource blocks in the K time-frequency resource blocks, and the K1 second values are respectively related to numbers of REs comprised in the K1 time-frequency resource blocks.

4. The first node according to claim 1, wherein any of the K1 second values is related to a total number of REs occupied by the K1 second sub-signals.

5. The first node according to claim 1, wherein a first-type value and a first offset are used to determine a total number of REs occupied by the K1 second sub-signals, and the first-type value is related to a number of REs comprised in each of the K time-frequency resource blocks.

6. The first node according to claim 1, wherein the first receiver receives a second radio signal; wherein the second signaling is used to determine time-frequency resources occupied by the second radio signal, and the second radio signal is used to generate the second bit block.

7. The first node according to claim 1, wherein the second signaling is used to determine a second radio resource block, and the second radio resource block is used to determine the K1 first radio signals.

8. A second node for wireless communications, comprising:
    a second transmitter, transmitting a first signaling and a second signaling, the first signaling being a physical-layer signaling, the second signaling being a physical-layer signaling; and
    a second receiver, receiving K first radio signals in K time-frequency resource blocks respectively, the K first radio signals are respectively transmitted on a Physical Uplink Shared Channel (PUSCH);
    wherein each two of the K time-frequency resource blocks are mutually orthogonal in time domain; the K first radio signals respectively comprise K first sub-signals, each of the K first sub-signals carries a first bit block, the first bit block comprises one Transport Block (TB), the K first sub-signals are K repetitions of the first bit block, at least two of the K first sub-signals correspond to different Redundancy Versions (RVs), and the first signaling is used to determine the K time-frequency resource blocks and a size of the first bit block; only K1 first radio signals in the K first radio signals respectively comprise K1 second sub-signals, the K1 second sub-signals carry a second bit block, the second bit block carries Uplink Control Information (UCI), and the second signaling is used to determine the second bit block; a total number of REs occupied by the K1 second sub-signals is not greater than a first value, a first coefficient is used to determine the first value, and a higher-layer signaling indicates the first coefficient; numbers of REs occupied by the K1 second sub-signals are respectively not greater than K1 second values, K1 second coefficients are respectively used to determine the K1 second values, and each of the K1 second coefficients is configured by a higher-layer signaling; K and K1 are respectively positive integers greater than 1, and K1 is not greater than K.

9. The second node according to claim 8, wherein the K1 first radio signals are respectively transmitted in K1 time-frequency resource blocks in the K time-frequency resource blocks, and the first value is related to numbers of REs comprised in only the K1 time-frequency resource blocks in the K time-frequency resource blocks.

10. The second node according to claim 8, wherein the K1 first radio signals are respectively transmitted in K1 time-frequency resource blocks in the K time-frequency resource blocks, and the K1 second values are respectively related to numbers of REs comprised in the K1 time-frequency resource blocks.

11. The second node according to claim 8, wherein any of the K1 second values is related to a total number of REs occupied by the K1 second sub-signals.

12. The second node according to claim 8, wherein a first-type value and a first offset are used to determine a total number of REs occupied by the K1 second sub-signals, and the first-type value is related to a number of REs comprised in each of the K time-frequency resource blocks.

13. The second node according to claim 8, wherein the second transmitter transmits a second radio signal; wherein the second signaling is used to determine time-frequency resources occupied by the second radio signal, and the second radio signal is used to generate the second bit block.

14. The second node according to claim 8, wherein the second signaling is used to determine a second radio resource block, and the second radio resource block is used to determine the K1 first radio signals.

15. A method in a first node for wireless communications, comprising:
    receiving a first signaling and a second signaling, the first signaling being a physical-layer signaling, the second signaling being a physical-layer signaling; and
    transmitting K first radio signals in K time-frequency resource blocks respectively, the K first radio signals are respectively transmitted on a Physical Uplink Shared Channel (PUSCH);
    wherein each two of the K time-frequency resource blocks are mutually orthogonal in time domain; the K first radio signals respectively comprise K first sub-signals, each of the K first sub-signals carries a first bit block, the first bit block comprises one Transport Block (TB), the K first sub-signals are K repetitions of the first bit block, at least two of the K first sub-signals correspond to different Redundancy Versions (RVs), and the first signaling is used to determine the K time-frequency resource blocks and a size of the first bit block; only K1 first radio signals in the K first radio signals respectively comprise K1 second sub-signals, the K1 second sub-signals carry a second bit block, the second bit block carries Uplink Control Information (UCI), and the second signaling is used to determine the second bit block; a total number of REs occupied by the K1 second sub-signals is not greater than a first value, a first coefficient is used to determine the first value, and a higher-layer signaling indicates the first coefficient; numbers of REs occupied by the K1 second sub-signals are respectively not greater than K1 second values, K1 second coefficients are respectively used to determine the K1 second values, and each of the K1 second coefficients is configured by a higher-layer signaling; K and K1 are respectively positive integers greater than 1, and K1 is not greater than K.

16. The method according to claim 15, wherein the K1 first radio signals are respectively transmitted in K1 time-frequency resource blocks in the K time-frequency resource blocks, and the first value is related to numbers of REs comprised in only the K1 time-frequency resource blocks in the K time-frequency resource blocks.

17. The method according to claim 15, wherein the K1 first radio signals are respectively transmitted in K1 time-frequency resource blocks in the K time-frequency resource blocks, and the K1 second values are respectively related to numbers of REs comprised in the K1 time-frequency resource blocks.

18. The method according to claim 15, wherein any of the K1 second values is related to a total number of REs occupied by the K1 second sub-signals.

19. The method according to claim 15, wherein a first-type value and a first offset are used to determine a total number of REs occupied by the K1 second sub-signals, and the first-type value is related to a number of REs comprised in each of the K time-frequency resource blocks;
    or, the second signaling is used to determine a second radio resource block, and the second radio resource block is used to determine the K1 first radio signals.

20. The method according to claim 15, comprising:
receiving a second radio signal; wherein the second signaling is used to determine time-frequency resources occupied by the second radio signal, and the second radio signal is used to generate the second bit block.

\* \* \* \* \*